US009489741B2

United States Patent
Ukil et al.

(10) Patent No.: US 9,489,741 B2
(45) Date of Patent: Nov. 8, 2016

(54) METHOD, APPARATUS AND COMPUTER PROGRAM PRODUCT FOR DISPARITY ESTIMATION OF FOREGROUND OBJECTS IN IMAGES

(71) Applicant: Nokia Technologies Oy, Espoo (FI)

(72) Inventors: Soumik Ukil, Bangalore (IN); Veldandi Muninder, San Jose, CA (US); Krishna Annasagar Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/793,043

(22) Filed: Jul. 7, 2015

(65) Prior Publication Data
US 2016/0063719 A1 Mar. 3, 2016

(30) Foreign Application Priority Data

Aug. 28, 2014 (IN) .......................... 4229/CHE/2014

(51) Int. Cl.
*G06K 9/00* (2006.01)
*G06T 7/00* (2006.01)
(Continued)

(52) U.S. Cl.
CPC ............. *G06T 7/0075* (2013.01); *G06T 5/006* (2013.01); *G06T 7/0022* (2013.01); *H04N 13/0022* (2013.01); *H04N 13/0203* (2013.01); *H04N 13/0239* (2013.01); *H04N 13/0271* (2013.01); *G06T 2207/10012* (2013.01);
(Continued)

(58) Field of Classification Search
CPC .......... G06T 2207/10012; G06T 2207/10024; G06T 2207/20228; G06T 5/006; G06T 7/0022; G06T 7/0075; H04N 13/0022; H04N 13/0203; H04N 13/0239; H04N 13/0271; H04N 2013/0081

USPC ........................................................ 382/103
See application file for complete search history.

(56) References Cited

U.S. PATENT DOCUMENTS 7,512,262 B2 * 3/2009 Criminisi ........... G06K 9/00241
382/106
8,249,333 B2 8/2012 Agarwal et al.
(Continued)

FOREIGN PATENT DOCUMENTS

KR 2008-0052363 A 6/2008

OTHER PUBLICATIONS

Yang, "A Non-Local Cost Aggregation Method for Stereo Matching", IEEE Conference on Computer Vision and Pattern Recognition (CVPR), Jun. 16-21, 2012, pp. 1402-1409.
Mei et al., "Segment Tree Based Cost Aggregation for Stereo Matching", IEEE Conference on Computer Vision and Pattern Recognition, Jun. 23-28, 2013, pp. 313-320.
(Continued)

Primary Examiner — Tom Y Lu
(74) Attorney, Agent, or Firm — Nokia Technologies Oy

(57) ABSTRACT

In an example embodiment, method, apparatus and computer program product are provided. The method includes facilitating receipt of first image (I1) and second image (I2) of a scene. Cost volume between images I1 and I2 for set of foreground labels (FL) and set of background labels (BL) is determined that includes matching costs of pixels in I1 and corresponding pixels in I2 for FL and BL. Reduced cost volume is determined from the cost volume, including matching costs of pixels in I1 and corresponding pixels in I2 for FL and a background label (L1) of BL, where matching cost of an individual pixel in I1 and corresponding pixel of the individual pixel in I2 for L1 includes minimum matching cost from a set of matching costs of the individual pixel for BL. A disparity map is generated by performing cost aggregation of the reduced cost volume in I1 and I2.

22 Claims, 10 Drawing Sheets

(51) Int. Cl.
  *H04N 13/00* (2006.01)
  *H04N 13/02* (2006.01)
  *G06T 5/00* (2006.01)

(52) U.S. Cl.
  CPC ............... *G06T 2207/10024* (2013.01); *G06T 2207/20228* (2013.01); *H04N 2013/0081* (2013.01)

(56) References Cited

U.S. PATENT DOCUMENTS

| | | | |
|---|---|---|---|
| 8,488,870 B2* | 7/2013 | Martinez-Bauza | ... G06T 7/0022 345/427 |
| 2007/0031037 A1* | 2/2007 | Blake | ................ G06K 9/00234 382/173 |
| 2013/0127824 A1* | 5/2013 | Cohen | .................. G06T 7/0083 345/419 |

OTHER PUBLICATIONS

Yang et al., "Full-Image Guided Filtering for Fast Stereo Matching", IEEE Signal Processing Letters, vol. 20, No. 3, Mar. 2013, pp. 1-4.
Bai et al., "An Efficient Window-Based Stereo Matching Algorithm Using Foreground Disparity Concentration", International Conference on Control Automation Robotics & Vision (ICARV), Dec. 5-7, 2012, pp. 1352-1357.
Kim et al., "Real-Time Disparity Estimation Using Foreground Segmentation for Stereo Sequences", Video and Display Technologies, Optical Engineering, vol. 45, No. 3, Mar. 22, 2006, pp. 1-10.
McNerney et al., "Block-Based MAP Disparity Estimation Under Alpha-Channel Constraints", IEEE Transactions on Circuits and Systems for Video Technology, vol. 17, No. 6, Jun. 2007, pp. 785-789.
Extended European Search Report received for corresponding European Patent Application No. 15177005.4, dated Feb. 2, 2016, 5 pages.
Hosni et al., "Fast Cost-Volume Filtering for Visual Correspondence and Beyond", IEEE Transactions on Pattern Analysis and Machine Intelligence, vol. 35, No. 2, Feb. 2013, pp. 504-511.

\* cited by examiner

METHOD, APPARATUS AND COMPUTER PROGRAM PRODUCT FOR DISPARITY ESTIMATION OF FOREGROUND OBJECTS IN IMAGES

TECHNICAL FIELD

Various implementations relate generally to method, apparatus, and computer program product for disparity estimation of foreground objects in images.

BACKGROUND

Various electronic devices, for example, cameras, mobile phones, and other multimedia devices are widely used for capturing digital images. Some electronic devices are capable of capturing stereoscopic/multi-view images of a scene, and performing disparity map estimation of the scene using the stereoscopic images and/or the multi-view images. The disparity map estimation is a process that determines shifts in pixels between the multi-view images of the scene. One type of the disparity map estimation includes disparity estimation of foreground objects (objects located close to an electronic device) for use in applications such as foreground extraction and artificial bokeh among others. Several disparity estimation techniques for the disparity map estimation of the foreground objects are in use, however, such techniques are complex and suffer from drawbacks in accuracy and speed of computation.

SUMMARY OF SOME EMBODIMENTS

Various aspects of example embodiments are set out in the claims.

In a first aspect, there is provided a method comprising: facilitating receipt of a first image and a second image of a scene, the first image and the second image being different view images of the scene; determining a cost volume between the first image and the second image for a set of foreground labels and a set of background labels, the cost volume comprising matching costs of pixels in the first image and corresponding pixels in the second image for the set of foreground labels and for the set of background labels; determining a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and generating a disparity map by performing at least a cost aggregation of the reduced cost volume in the first image and the second image.

In a second aspect, there is provided an apparatus comprising at least one processor; and at least one memory comprising computer program code, the at least one memory and the computer program code configured to, with the at least one processor, cause the apparatus to at least perform: facilitate receipt of a first image and a second image of a scene, the first image and the second image being different view images of the scene; determine a cost volume between the first image and the second image for a set of foreground labels and a set of background labels, the cost volume comprising matching costs of pixels in the first image and corresponding pixels in the second image for the set of foreground labels and for the set of background labels; determine a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and generate a disparity map by performing at least a cost aggregation of the reduced cost volume in the first image and the second image.

In a third aspect, there is provided a computer program product comprising at least one computer-readable storage medium, the computer-readable storage medium comprising a set of instructions, which, when executed by one or more processors, cause an apparatus to at least perform: facilitate receipt of a first image and a second image of a scene, the first image and the second image being different view images of the scene; determine a cost volume between the first image and the second image for a set of foreground labels and a set of background labels, the cost volume comprising matching costs of pixels in the first image and corresponding pixels in the second image for the set of foreground labels and for the set of background labels; determine a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and generate a disparity map by performing at least a cost aggregation of the reduced cost volume in the first image and the second image.

In a fourth aspect, there is provided an apparatus comprising: means for facilitating receipt of a first image and a second image of a scene, the first image and the second image being different view images of the scene; means for determining a cost volume between the first image and the second image for a set of foreground labels and a set of background labels, the cost volume comprising matching costs of pixels in the first image and corresponding pixels in the second image for the set of foreground labels and for the set of background labels; means for determining a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and means for generating a disparity map by performing at least a cost aggregation of the reduced cost volume in the first image and the second image.

In a fifth aspect, there is provided a computer program comprising program instructions which when executed by an apparatus, cause the apparatus to: facilitate receipt of a first image and a second image of a scene, the first image and the second image being different view images of the scene; determine a cost volume between the first image and the second image for a set of foreground labels and a set of background labels, the cost volume comprising matching costs of pixels in the first image and corresponding pixels in the second image for the set of foreground labels and for the set of background labels; determine a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and generate a disparity map by performing at least a cost aggregation of the reduced cost volume in the first image and the second image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 11A-11B of the drawings.

Figure 1:
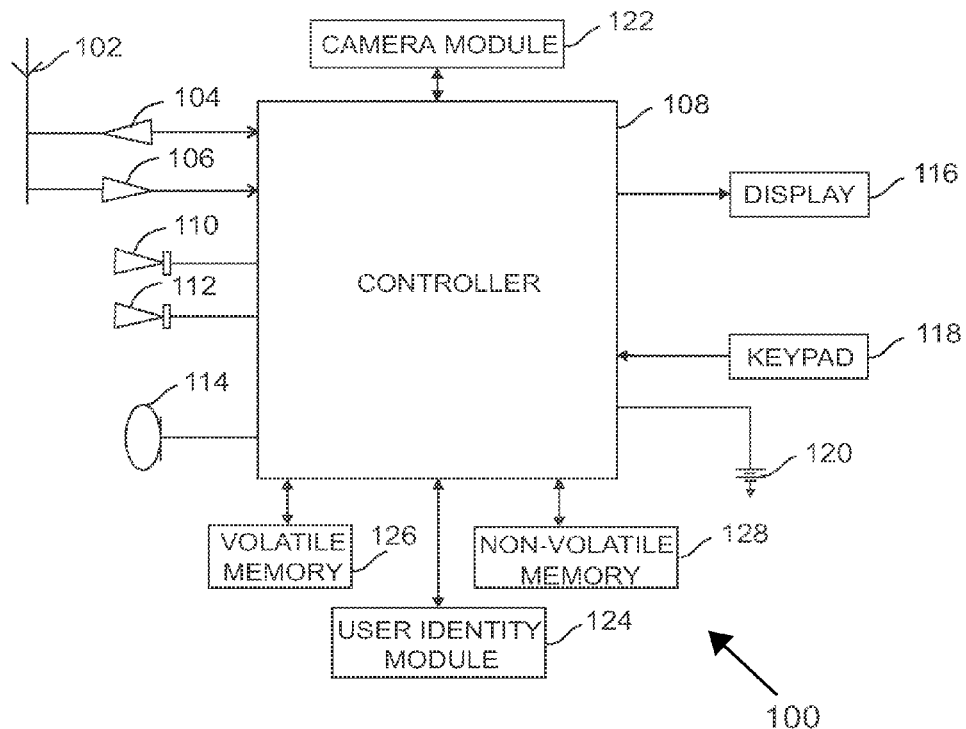
FIG. 1 illustrates a device, in accordance with an example embodiment.

FIG. 1 illustrates a device 100, in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of touch screen based mobile electronic devices, for example, portable digital assistants (PDAs), mobile televisions, gaming devices, cellular phones, all types of computers (for example, laptops, mobile computers or desktops), cameras, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional web browser. The connectivity program may then allow the device 100 to transmit and receive web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
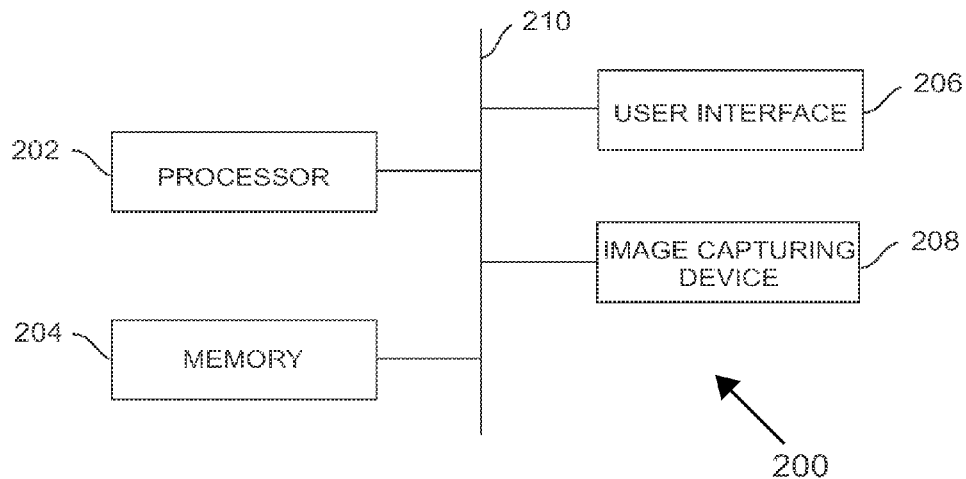
FIG. 2 illustrates an apparatus for disparity estimation of foreground objects in images, in accordance with an example embodiment.

FIG. 2 illustrates an apparatus 200 for disparity estimation of foreground objects in images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202.

Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of the media content may include audio content, video content, data, and a combination thereof.

In an example embodiment, the electronic device may be embodied as to include an image capturing device 208. The image capturing device 208 may be an example of a light-field camera capable of capturing multiple views of a scene, or a stereoscopic camera capable of capturing a stereoscopic pair of images, or even a standard camera capable of capturing multiple views of the scene by moving the camera. The image capturing device 208 may be in communication with the processor 202 and/or other components of the apparatus 200. The image capturing device 208 may be in communication with other imaging circuitries and/or software, and is configured to capture digital images or to capture video or other graphic media. In an example embodiment, the image capturing device 208 may be an array camera, or a plenoptic camera capable of capturing light-field images (having multiple views of the same scene) and various view images of the scene be generated from such captured images. In another example embodiment, the image capturing device 208 may include the stereoscopic camera capable of capturing two different view images. The image capturing device 208, and other circuitries, in combination, may be examples of at least one camera module such as the camera module 122 of the device 100.

These components (202-208) may communicate to each other via a centralized circuit system 210 to facilitate disparity estimation of foreground objects in images. The centralized circuit system 210 may be various devices configured to, among other things, provide or enable communication between the components (202-208) of the apparatus 200. In certain embodiments, the centralized circuit system 210 may be a central printed circuit board (PCB)

such as a motherboard, main board, system board, or logic board. The centralized circuit system 210 may also, or alternatively, include other printed circuit assemblies (PCAs) or communication channel media.

In an example embodiment, the apparatus 200 is caused to perform disparity estimation of foreground objects in images. Herein, the 'foreground objects' refer to objects in the scene that are located close to the image capturing device 208. In this example embodiment, the processor 202 is configured to, with the content of the memory 204, and optionally with other components described herein, to cause the apparatus 200 to facilitate receipt of a first image (I1) and a second image (I2) of a scene. Herein, the first image I1 and the second image I2 represent different view images of the scene. Herein, the 'scene' refers to an arrangement (natural, manmade, sorted or assorted) of one or more objects of which images and/or videos can be captured. In an example embodiment, the first image I1 and the second image I2 may also be a stereoscopic pair of images of the scene. In another example embodiment, the apparatus 200 is caused to receive a light-field image and may be configured to generate the first image I1 and the second image I2 of the scene. In an example embodiment, the first image I1 and the second image I2 are associated with the scene including one or more objects of various depths in the scene. In an example embodiment, the first image I1 and the second image I2 are captured by the image capturing device 208 present in or otherwise accessible to the apparatus 200. Alternatively, the first image I1 and the second image I2 may be prerecorded or stored in the apparatus 200, or may be received from sources external to the apparatus 200. As such the apparatus 200 may be caused to receive the first image I1 and the second image I2 from external storage medium such as DVD, Compact Disk (CD), flash drive, memory card, or from external storage locations through Internet, Bluetooth®, and the like. In an example embodiment, a processing means may be configured to facilitate receipt of first image I1 and the second image I2. An example of the processing means may include the processor 202, which may be an example of the controller 108, and the image capturing device 208.

In an example embodiment, the processor 202 is configured to, with the content of the memory 204, and optionally with other components described herein, to cause the apparatus 200 to determine a cost volume (CV) between the first image I1 and the second image I2 for a set of foreground labels (FL) and a set of background labels (BL). For example, the cost volume CV may be determined to include matching costs of pixels in the first image I1 and corresponding pixels in the second image I2 for the set of foreground labels (FL) and for the set of background labels (BL). Herein, the 'cost volume' may be understood as a three dimensional array that includes the matching costs for choosing a disparity label at pixel P at a (x, y) location in the images I1 and I2. The cost volume expresses how well a pixel P in the first image I1 matches a corresponding (same) pixel P' in the second image I2 shifted by a vector V. In an example embodiment, the matching costs may be determined as a difference of color and/or gradient at matching points between the pixels in the images I1 and I2.

In an example embodiment, there may be a set of disparity labels (L) between pixels in the first image I1 and corresponding pixels in the second image I2. For example, it may be assumed that there are 256 different disparity labels (label 0 to label 255) between the images I1 and I2, and the label 0 to label 100 may be defined as a set of background labels (BL) and label 101 to label 255 may be defined as a set of foreground labels (FL). Each disparity label defines a displacement in x and y directions between a pixel in the image I1 and a corresponding pixel in the image I2. For example, in an embodiment, a label 0 may be associated with pixels of background objects in the scene that are farthest from the image capturing device 208. Similarly, a label 255 may be associated with pixels of foreground objects in the scene that are closest from the image capturing device 208. In an example embodiment, matching costs for a pixel P1 in the first image I1 and a corresponding pixel P1' in the second image I2 are calculated for all 256 labels. For example, in an embodiment, the pixel P1 and the corresponding pixel P1' have 256 matching costs (matching cost 0-matching cost 255). In an example embodiment, the matching costs are determined for all pixels in the first image I1 and corresponding pixels in the second image I2 for the 256 labels that include the foreground labels FL and the background labels BL. In an example, a matching cost may refer to a degree of similarity (or distance) between two corresponding pixels in the first image I1 and the second image I2, where a degree of similarity (or distance) is measured in terms of intensity, color, or other image features. The cost volume CV between the first image I1 and the second image I2 for the 256 labels is determined based on the matching costs for all pixels in the first image I1 and corresponding pixels in the second image I2. In an example, the cost volume CV is computed using a color difference method between the pixels in the first image I1 and the corresponding pixels in the second image I2. In an embodiment, the cost volume CV is a three-dimensional cost volume of a size (W*H*L), where W is width of the first image I1 or the second image I2, H is height of the first image I1 or the second image I2, and L is number of labels in the set of labels (BL and FL). For 256 labels, the cost volume CV is of a size (W*H*256). In an example embodiment, the apparatus 200 may be caused to determine the cost volume CV between the first image I1 and the second image I2 for FL and BL. In an example embodiment, a processing means may be configured to determine the cost volume CV between the first image I1 and the second image I2 for FL and BL. An example of the processing means may include the processor 202, which may be an example of the controller 108.

In an example embodiment, the apparatus 200 is caused to determine a reduced cost volume (RCV) from the cost volume CV. In an example embodiment, the cost volume RCV may be determined to include matching costs of pixels in the first image I1 and corresponding pixels in the second image I2 for the FL and for a background label (L1) of BL. In an example embodiment, the background label L1 may be a boundary label (a cut-off label for the foreground label FL) of the BL. Alternatively, the background label L1 may also be any label of the BL. In an example scenario, if the label 0 to label 100 are assigned as the background labels BL in the set of labels L and the label 101 to the label 255 are assigned as the foreground labels FL, the RCV may include matching costs for the FL (labels 101 to 255) and the label 100 (for example, the boundary label of BL).

In a representation, the set of labels L include the set of background labels BL and the set of foreground labels, where the set of background labels include label 0 to L1 (BL∈(0, L1)) and the set of foreground labels FL include labels L1+1 to Lmax (FL∈(L1+1, Lmax)). In an example embodiment, the cost volume CV is calculated for the BL and the FL, for example, for the labels 0 to L1 and L1+1 to Lmax, however, it should be noted that the reduced cost volume RCV is derived from the CV such that the RCV includes only matching costs for the L1 and L1+1 to Lmax. For instance, if the BL includes 0 to 100, and FL includes 101 to 255 and the label 100 is selected as the background label (L1), the RCV includes matching costs for the label 100 and the labels 101 to 255, that is a total of 156 labels, as opposed to 256 labels present in the CV.

In an example embodiment, the matching cost for the background label L1 is selected as a minimum matching cost from among a set of matching costs for the set of background labels BL (for example, minimum matching costs from among the set of matching costs for the labels 0 to L1). For instance, if the background label L1 is 100 for the BL (ranging from label 0 to label 100), a minimum matching cost is determined from among the set of matching costs starting from the label 0 to label 100 of the pixel P1 and the corresponding pixel P1'. In an example embodiment, the minimum matching cost is then assigned as the matching cost of the label 100. For example, for the pixel P1 in the image I1, if a label 40 is associated with the minimum matching cost from among the label 0 to label 100, the matching cost of the label 40 is assigned to the matching cost of the label 100. It should be noted that the label 100 is representative of the background labels BL and each background label (0 to 100) is assigned as label L1, for example, in this case, the label 100. In the reduced cost volume RCV, the matching costs for the pixel P1 and the corresponding pixel P1' will now only include the matching cost of the background label L1 and the matching costs of the set of foreground labels FL. It should be noted that the cost volume CV between the first image I1 and the second image I2 for the 256 labels is pruned to determine the reduced cost volume RCV that includes cost volume only for 156 labels, for example, by not including the label 0 to label 99 of BL. The reduced cost volume RCV is based on the matching costs for all pixels in the first image I1 and corresponding pixels in the second image I2 for the set of foreground labels FL and the background label L1. In a representation, the reduced cost volume RCV is a three-dimensional cost volume of a size (W*H*N), where W is width of the first image I1 or the second image I2, H is height of the first image I1 or the second image I2, and N is the number of labels in the FL plus one. In an example embodiment, the memory 204 requires considerably less space for storing the reduced cost volume RCV as compared to space required for storing the cost volume CV, and also a processing of the RCV is computationally less intensive as compared to processing the CV to generate the disparity map. In an example embodiment, a processing means may be configured to determine the reduced cost volume RCV from the cost volume CV. An example of the processing means may include the processor 202, which may be an example of the controller 108.

In an example embodiment, the apparatus 200 is configured to generate a disparity map (D) by performing at least a cost aggregation of the reduced cost volume RCV in the first image I1 and the second image I2. It should be noted that various kinds of cost aggregation techniques of the reduced cost volume, for example, local or non-local cost aggregation may be used. For instance, cost aggregations techniques may include, but are not limited to a tree based aggregation and an image-guided aggregation. Various example embodiments are explained by way of examples of tree based aggregation, but it should be understood that other methods of cost aggregation may also be used. In an example embodiment, the tree based aggregation is a minimum spanning tree based aggregation of the RCV to generate the disparity map D. In an example, the minimum spanning tree and the aggregation of the reduced cost volume may be determined using a cost aggregation method as set forth in Qingxiong Yang, "A Non-Local Cost Aggregation Method for Stereo Matching," in *CVPR*2012, pp. 1402-1409, or as set forth in Mei, Xing, et al. "Segment-Tree based Cost Aggregation for Stereo Matching" in *Computer Vision and Pattern Recognition (CVPR)*, 2013 *IEEE Conference on IEEE*, 2013. In an example embodiment, a processing means may be configured to generate a disparity map D by performing at least a tree based aggregation of the reduced cost volume RCV in the first image I1 and the second image I2. An example of the processing means may include the processor 202, which may be an example of the controller 108.

Various suitable techniques may be used to generate the disparity map D. Some example embodiments of generating the disparity map D are explained in the following description, however, these example embodiments should not be considered as limiting to the scope of the present technology.

In an example embodiment of generating the disparity map D, the apparatus 200 is caused to generate a first disparity map D1 of the first image I1. In an example embodiment, the apparatus 200 is caused to perform the tree based aggregation of the reduced cost volume RCV in the first image I1 to determine a first aggregated cost volume A1. In an example embodiment, the apparatus 200 is caused to assign disparity labels from the set of foreground labels FL and the background label L1 to the pixels in the first image I1. In this embodiment of generating the disparity map D, the apparatus 200 is caused to generate a second disparity map D2 of the second image I2. In an example embodiment, the apparatus 200 is caused to perform the tree based aggregation of the reduced cost volume RCV in the second image I2 to determine a second aggregated cost volume A2. In an example embodiment, the first disparity map D1 and the second disparity map D2 may be generated using a winner-take-all method. In an example embodiment, the first aggregated cost volume A1 and the second aggregated cost volume A2 may be determined using a cost aggregation method as set forth in Qingxiong Yang, "A Non-Local Cost Aggregation Method for Stereo Matching," in *CVPR*2012, pp. 1402-1409, or as set forth in Mei, Xing, et al. "Segment-Tree based Cost Aggregation for Stereo Matching" in *Computer Vision and Pattern Recognition (CVPR)*, 2013 *IEEE Conference on IEEE*, 2013. In an example embodiment, the apparatus 200 is caused to assign disparity labels from the set of foreground labels FL and the background label L1 to the pixels in the second image I2. In this embodiment of generating the disparity map D, the apparatus 200 is caused to generate the disparity map D based on the first disparity map D1 and the second disparity map D2. In an example embodiment, a processing means may be configured to generate the disparity map D based on the first disparity map D1 and the second disparity map D2. An example of the processing means may include the processor 202, which may be an example of the controller 108.

In an embodiment (for example, a first example embodiment) of generating the disparity map D based on the first disparity map D1 and the second disparity map D2, the apparatus 200 is caused to determine a first confidence map C1 for disparity labels at the pixels in the first image I1 in the first disparity map D1 based on the first aggregated cost volume A1. In this embodiment of generating the disparity map D based on the first disparity map D1 and the second disparity map D2, the apparatus 200 is caused to determine a second confidence map C2 for disparity labels at the pixels in the second image I2 in the second disparity map D2 based on the second aggregated cost volume A2. In this embodiment of generating the disparity map D, the apparatus 200 is caused to filter the disparity labels in the first disparity map D1 based on the first confidence map C1 to generate a first filtered disparity map F1. In this embodiment of generating the disparity map D based on the first disparity map D1 and the second disparity map D2, the apparatus 200 is caused to filter the disparity labels in the second disparity map D2 based on the second confidence map C2 to generate a second filtered disparity map F2.

In this embodiment (the first example embodiment) of generating the disparity map D based on the first disparity map D1 and the second disparity map D2, the apparatus 200 is caused to determine occlusion pixels by comparing the first filtered disparity map F1 and the second filtered disparity map F2. In this embodiment, the apparatus 200 is caused to assign disparity labels to the occlusion pixels. In this embodiment, the apparatus 200 is caused to combine the first filtered disparity map F1, the second filtered disparity map F2 and the assigned disparity labels to the occlusion pixels to generate the disparity map D. In an example embodiment, a processing means may be configured to generate the disparity map D by combining the first filtered disparity map F1, the second filtered disparity map F2 and the assigned disparity labels to the occlusion pixels. An example of the processing means may include the processor 202, which may be an example of the controller 108.

In another embodiment (a second example embodiment) of generating the disparity map D based on the first disparity map D1 and the second disparity map D2, the apparatus 200 is caused to generate a third disparity map (D3) from the first disparity map D1. In an example embodiment, the third disparity map D3 is generated by correcting the disparity labels at one or more foreground pixels in the D1 that may have been wrongly labeled as L1. For instance, in an example embodiment, the pixels that are labeled as L1 in the D1 are checked whether the labeling of these pixels as L1 is correct or not. Accordingly, in an example embodiment, the apparatus 200 is caused to determine a pixel in the first image I1 that is labeled as the background label L1. For instance, the apparatus 200 is caused to determine pixels in the first image I1 that are assigned with the background label L1. In this embodiment of generating the third disparity map D3, the apparatus 200 is caused to calculate a first minimum data cost (MC1) and a second minimum data cost (MC2) for each of the pixels in the first image I1 that are assigned with the background label L1. In an example embodiment, the MC1 and the MC2 are calculated for a pixel based on the first aggregated cost volume A1. For example, the MC1 may be calculated from the A1 as a lowest data cost for the pixel for any disparity label, and the MC2 may be calculated from the A1 as a second lowest data cost for the pixel for any disparity label. In this embodiment of generating the third disparity map D3, the apparatus 200 is caused to determine a first ratio (R1) of the second minimum data cost MC2 and the first minimum data cost MC1 for the pixel in the first image I1. In this embodiment of generating the third disparity map D3, the apparatus 200 is caused to determine whether the pixel in the first image I1 is correctly labeled as the background label L1 based on the first ratio R1. In this embodiment of generating the third disparity map D3, the apparatus 200 is caused to update a disparity label at the pixel in the first image I1 with a disparity label corresponding to the second minimum data cost MC2. For instance, the first ratio R1 can be compared with a threshold (T) to determine if the pixel in the first image I1 is correctly labeled as the background label L1. If the first ratio R1 is greater than the threshold T, then the pixel in the first image I1 is determined to be correctly labeled as the background label L1. If the first ratio R1 is lesser than the threshold T, then a disparity label at the pixel in the first image I1 is updated with a disparity label corresponding to the second minimum data cost MC2. It should be noted that in an example embodiment, the calculation of the first ratio R1 and checking whether the pixel is correctly labeled as L1 is performed for all those pixels that are labeled as L1 in the first disparity map D1, and disparity labels for those pixels in the D1 that are determined as wrongly labeled, are updated to generate the third disparity map D3. In an example embodiment, a processing means may be configured to generate the third disparity map D3 from the first disparity map D1. An example of the processing means may include the processor 202, which may be an example of the controller 108.

In this embodiment (the second example embodiment) of generating the disparity map D based on the first disparity map D1 and the second disparity map D2, the apparatus 200 is caused to generate a fourth disparity map (D4) from the second disparity map D2. In an example embodiment, the fourth disparity map D4 is generated by correcting the disparity labels at one or more foreground pixels in the D2 that may have been wrongly labeled as L1. For instance, in an example embodiment, the pixels that are labeled as L1 in the D2 are checked whether the labeling of these pixels as L1 is correct or not. Accordingly, in an example embodiment, the apparatus 200 is caused to determine a pixel in the second image I2 that is labeled as the background label L1. For instance, the apparatus 200 is caused to determine pixels in the second image I2 that are assigned with the background label L1. In this embodiment of generating the fourth disparity map D4, the apparatus 200 is caused to calculate a first minimum data cost (MC1) and a second minimum data cost (MC2) for each of the pixels in the second image I2 that are assigned with the background label L1. In an example embodiment, the MC1 and the MC2 are calculated for a pixel based on the second aggregated cost volume A2. For example, the MC1 may be calculated from the A2 as a lowest data cost for the pixel for any disparity label, and the MC2 may be calculated from the A2 as a second lowest data cost for the pixel for any disparity label. In this embodiment of generating the fourth disparity map D4, the apparatus 200 is caused to determine a second ratio (R2) of the second minimum data cost MC2 and the first minimum data cost MC1 for the pixel in the second image I2. In this embodiment of generating the fourth disparity map D4, the apparatus 200 is caused to determine whether the pixel in the second image I2 is correctly labeled as the background label L1 based on the second ratio R2. In this embodiment of generating the fourth disparity map D4, the apparatus 200 is caused to update a disparity label at the pixel in the second image I2 with a disparity label corresponding to the second minimum data cost MC2. For instance, the second ratio R2 can be compared with a threshold (T) to determine if the pixel in the second image I2 is correctly labeled as the background label L1. If the second ratio R2 is greater than the threshold T, then the pixel in the second image I2 is determined to be correctly labeled as the background label L1. If the second ratio R2 is lesser than the threshold T, then a disparity label at the pixel in the second image I2 is updated with a disparity label corresponding to the second minimum data cost MC2. It should be noted that in an example embodiment, the calculation of the second ratio R2 and checking whether the pixel is correctly labeled as L1 is performed for all those pixels that are labeled as L1 in the second disparity map D2, and disparity labels for those pixels in the D2 that are determined as wrongly labeled, are updated to generate the fourth disparity map D4. In an example embodiment, a processing means may be configured to generate the fourth disparity map D4 from the second disparity map D2. An example of the processing means may include the processor 202, which may be an example of the controller 108.

In this embodiment (the second example embodiment), the apparatus 200 is caused to generate the disparity map D based on the third disparity map D3 and the fourth disparity map D4. In an example embodiment, a processing means may be configured to generate the disparity map D based on the third disparity map D3 and the fourth disparity map D4. An example of the processing means may include the processor 202, which may be an example of the controller 108. In this embodiment of generating the disparity map D based on the third disparity map D3 and the fourth disparity map D4, the apparatus 200 is caused to determine occlusion pixels by comparing the third disparity map D3 and the fourth disparity map D4. In this embodiment of generating the disparity map D based on the third disparity map D3 and the fourth disparity map D4, the apparatus 200 is caused to assign disparity labels to the occlusion pixels. In this embodiment of generating the disparity map D based on the third disparity map D3 and the fourth disparity map D4, the apparatus 200 is caused to combine the third disparity map D3, the fourth disparity map D4 and the assigned disparity labels to the occlusion pixels to generate the disparity map D. In an example embodiment, a processing means may be configured to generate the disparity map D by combining the third disparity map D3, the fourth disparity map D4 and the assigned disparity labels to the occlusion pixels. An example of the processing means may include the processor 202, which may be an example of the controller 108.

In this embodiment (for example, a third example embodiment) of generating the disparity map D based on the third disparity map D3 and the fourth disparity map D4, the apparatus 200 is caused to determine a first confidence map C1 for disparity labels at the pixels in the first image I1 in the third disparity map D3 based on the first aggregated cost volume A1. In this embodiment of generating the disparity map D based on the third disparity map D3 and the fourth disparity map D4, the apparatus 200 is caused to determine a second confidence map C2 for disparity labels at the pixels in the second image I2 in the fourth disparity map D4 based on the second aggregated cost volume A2. In this embodiment of generating the disparity map D based on the third disparity map D3 and the fourth disparity map D4, the apparatus 200 is caused to filter the disparity labels in the third disparity map D3 based on the first confidence map C1 to generate a first filtered disparity map F1. In this embodiment of generating the disparity map D based on the third disparity map D3 and the fourth disparity map D4, the apparatus 200 is caused to filter the disparity labels in the fourth disparity map D4 based on the second confidence map C2 to generate a second filtered disparity map F2.

In an example embodiment, each of the first confidence map C1 and the second confidence map C2 includes a plurality of confidence values for pixels in the first image I1 and the second image I2, respectively. In an example embodiment, the apparatus 200 is caused to determine a confidence value ($C_p$) for a pixel p of the pixels in the images I1 or I2 based on an expression (1):

$$C_p = 1 - \frac{\sum_{d \neq d_p} e^{-\frac{(A(p,d)-A(p,d_p))^2}{\sigma^2}}}{S-1} \quad (1)$$

where dp is a disparity label at the pixel p, (A(p, d)) is an aggregated data cost of the pixel p at disparity d, (A(p, dp)) is an aggregated data cost of the pixel p at the disparity dp, σ is a constant scaling factor, and S is a total number of the disparity labels.

In an example embodiment, each of the first filtered disparity map F1 and the second filtered disparity map F2 includes a plurality of filtered disparity labels for pixels in the first image I1 and the second image I2, respectively. In an example embodiment, the apparatus 200 is caused to determine a filtered disparity label ($d_{pf}$) for a pixel p of the pixels in an image (I) (for example, the image I1 or I2) based on an expression (2):

$$d_{pf} = \frac{1}{N_p} \sum_{q \in I} e^{-\frac{D(p,q)}{\sigma}} d_q C_q \quad (2)$$

where dpf is a filtered disparity label, Np is a normalizing term for the pixel p, D(p, q) is a distance between the pixel p and a pixel q in the tree based aggregation, σ is the constant scaling factor, dq is a disparity label at the pixel q in input disparity maps for example, D3 or D4, and Cq is a confidence value for the pixel q determined based on the expression (1). In an example embodiment, the normalizing term ($N_p$) is determined based on an expression (3):

$$N_p = \sum_{q \in I} e^{-\frac{D(p,q)}{\sigma}} C_q \quad (3)$$

In this embodiment (the third example embodiment), the apparatus 200 is caused to determine occlusion pixels by comparing the first filtered disparity map F1 and the second filtered disparity map F2. In this embodiment, the apparatus 200 is caused to assign disparity labels to the occlusion pixels. In this embodiment, the apparatus 200 is caused to combine the first filtered disparity map F1, the second filtered disparity map F2 and the assigned disparity labels to the occlusion pixels to generate the disparity map D. In an example embodiment, a processing means may be configured to generate the disparity map D by combining the first filtered disparity map F1, the second filtered disparity map F2 and the assigned disparity labels to the occlusion pixels. An example of the processing means may include the processor 202, which may be an example of the controller 108.

In another example embodiment, the disparity map D is generated by performing different levels of background suppression, in addition to the above steps. For such background suppression, a plurality of background labels can be selected as foreground cut-off labels. For instance, multiple background labels (instead of one background label L1) may be used to represent the entire background labels of 0 to L1. In an example, an image includes three people standing at different distances to the image capturing device 208 in a scene (for example, person 1 stands at a small distance (closest) to the image capturing device 208, person 2 stands at a medium distance to the image capturing device 208, and person 3 stands at a large distance (farthest) from the image capturing device 208. In an example, a label 40 may be selected as a first foreground cut-off label (or first boundary label BL1), a label 70 may be selected as a second foreground cut-off label (or second boundary label BL2) and a label 100 may be selected as a third foreground cut-off label (or third boundary label BL3). Hence, a first level of the background suppression can be performed by assigning a single label 40 to represent labels from 0 to 40, a second level of the background suppression can be performed by assigning a single label 70 to represent labels from 41 to 70, and a third level of the background suppression can be performed by assigning a single label 100 to represent labels from 71 to 100. On application of the first level of the background suppression, a disparity map $D^1$ is generated based on assigning a minimum matching cost of the matching costs for the label 0 to the label 40 to a matching cost of the label 40, and calculating the reduced cost volume RCV. A tree based aggregation is applied on the reduced cost volume RCV and the disparity map $D^1$ is generated by suppressing the background pixels (for example, a scene behind the person 3) that are labeled with label 40. Similarly, on application of the second level of the background suppression on the disparity map $D^1$, a disparity map $D^2$ is generated based on assigning a minimum matching cost of the matching costs for a label 41 to the label 70 to a matching cost of the label 70, and calculating the reduced cost volume RCV. A tree based aggregation is applied on the reduced cost volume RCV and the disparity map $D^2$ is generated by suppressing a background including person 3 in the image. On application of the third level of the background suppression on the disparity map $D^2$, a disparity map $D^3$ is generated based on assigning a minimum matching cost of the matching costs for a label 71 to the label 100 to a matching cost of the label 100, and calculating the reduced cost volume RCV. A tree based aggregation is applied on the reduced cost volume RCV and the disparity map $D^3$ is generated by suppressing the scene behind the person 3, the person 3 and the person 2 in the image.

Figure 3A:
FIG. 3A illustrates an example representation of a first image of a scene, in accordance with an example embodiment.
Figure 3B:
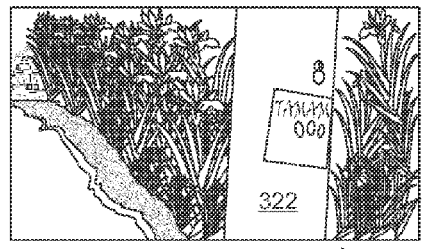
FIG. 3B illustrates an example representation of a second image of a scene, in accordance with an example embodiment.

FIG. 3A illustrates an example representation of a first image 300 of a scene, and FIG. 3B illustrates an example representation of a second image 320 of the scene, in accordance with an example embodiment. In this example representation, the first image 300 and the second image 320 are captured by an image capturing device (for example, the image capturing device 208). In an example embodiment, the first image 300 and the second image 320 are different view images of the scene. For instance, the first image 300 and the second image 320 may be a left view image and a right view image of a stereoscopic pair of images, respectively. The first image 300 includes foreground objects and background objects in a foreground and a background of the scene, respectively. For example, the foreground includes a foreground object (a tree 302) in the first image 300 and the background includes background objects at different disparity levels (plants and a building) in the first image 300. The second image 320 includes a foreground object (a tree 322) similar to the foreground object (the tree 302) in the first image 300, and the background includes background objects at different disparity levels (plants and a building) similar to the background objects in the first image 300. It should be noted that there may be different disparity values between pixels in the first image 300 and corresponding pixels in the second image 320. For instance, in an example, the different disparity values may be represented by a set of disparity labels (L), for example, disparity labels starting from 0 to 255. In an example representation, the label 0 may represent a pixel in the background farthest to the image capturing device and the label 255 may represent a pixel in the foreground closest to the image capturing device.

In an example embodiment, the set of disparity labels (L) may include a set of foreground labels FL and a set of background labels BL. For instance, the set of background labels BL can represent disparity of pixels of the background objects (for example, the plants and the building) and includes disparity labels between label 0 and label L1 (BL $\in$ (0, L1)), and the set of foreground labels FL can represent disparity of pixels of the foreground objects (the tree 302 or the tree 322) and includes disparity labels between label L1+1 and Lmax (FL $\in$ (L1+1, Lmax)). For example, it may be assumed that L includes 256 different disparity labels (for example, from label 0 to label 255) between the images I1 and I2, and the label 0 to label 100 may be defined as a set of background labels (BL) and label 101 to label 255 may be defined as a set of foreground labels (FL). As discussed with reference to FIG. 2, a cost volume CV is determined by calculating the matching costs of pixels in the first image 300 and corresponding pixels in the second image 320 for the disparity labels L (for example, for FL and for BL) to determine the cost volume. A reduced cost volume RCV is determined from the cost volume CV. In an example embodiment, the reduced cost volume includes the matching costs of the pixels in the first image 300 and the corresponding pixels in the second image 320 for FL and for a background label L1 of BL that represents all disparity labels of BL. In an example embodiment, if a label 100 is chosen as L1 to represent BL (the label 0 to label 100), a matching cost of a pixel for the label 100 is selected as a minimum matching cost from the matching costs of the pixel for the labels 0 to 100. In an example, if a matching cost for the label 40 is the minimum among the matching costs for the labels 0 to 100, the matching cost for the label 40, i.e. the minimum matching cost is assigned to the label 100 and all background labels (label 0 to label 100) are now re-labeled as the label 100.

Figure 4A:
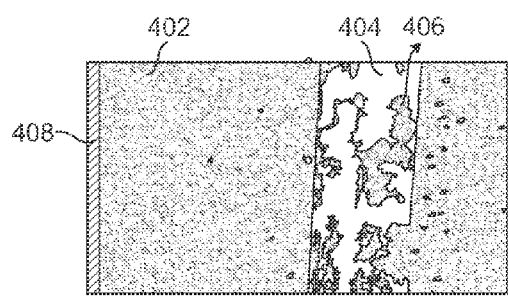
FIG. 4A illustrates an example representation of a first disparity map of a first image and FIG. 4B illustrates an example representation of a second disparity map of a second image, in accordance with an example embodiment.
Figure 4B:
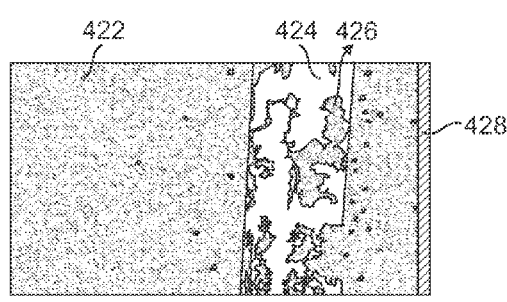

FIG. 4A illustrates an example representation of a first disparity map 400 of the first image 300, in accordance with an example embodiment, and FIG. 4B illustrates an example representation of a second disparity map 420 of the second image 320, in accordance with an example embodiment. It should be noted that the disparity maps 400 and 420 are shown for representation purposes only; and such representations are not provided to represent accurate disparity maps associated with the images 300 and 320, respectively, but to facilitate description of some example embodiments only. In an example embodiment, the first disparity map 400 is generated by performing cost aggregation, for example a tree-based aggregation, of the reduced cost volume in the first image 300 to determine a first aggregated cost volume, and by assigning labels from the FL and L1 to the pixels in the first image 300 to generate the first disparity map 400. In some example embodiments, a winner-take-all method is applied on the first aggregated cost volume to generate the first disparity map 400, or the second aggregated cost volume to generate the second disparity map 420. As illustrated in FIG. 4A, the first disparity map 400 of the first image 300 illustrates the background objects with the background label L1 (see, 402), and the foreground object (the tree 302) with corresponding disparity labels (see, 404). As shown in FIG. 4A, some pixels of the foreground object, for example the tree 302 may be incorrectly labeled with the background label L1, for example, a pixel in a region 406 of the tree 302 is incorrectly labeled with the background label L1. As illustrated in FIG. 4B, the second disparity map 400 of the second image 320 illustrates the background objects with the background label L1 (see, 422), and the foreground object (for example, the tree 322) with corresponding disparity labels (see, 424). As shown in FIG. 4B, some pixels of the foreground object, for example the tree 322, may be incorrectly labeled with the background label L1, for example, a pixel in a region 426 of the tree 322 is incorrectly labeled with the background label L1. It should also be noted that there may be occlusion pixels in the disparity maps 400 and 420, for example, a portion including occlusion pixels in the FIG. 4A is represented by an occluded portion 408 and a portion including occlusion pixels in the FIG. 4B is represented by an occluded portion 428.

Figure 5A:
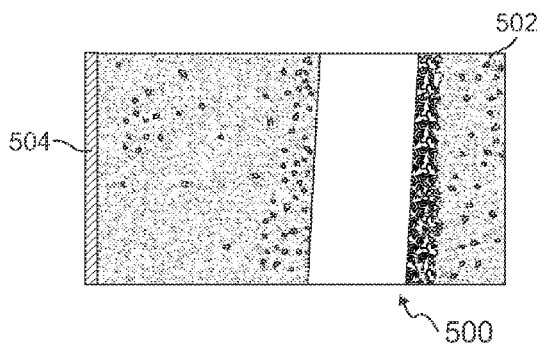
FIG. 5A illustrates an example representation of a third disparity map of a first image and FIG. 5B illustrates an example representation of a fourth disparity map of a second image, in accordance with an example embodiment.
Figure 5B:
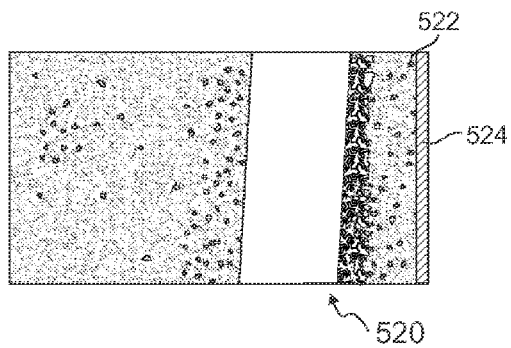

FIG. 5A illustrates an example representation of a third disparity map 500 of the first image 300, in accordance with an example embodiment, and FIG. 5B illustrates an example representation of a fourth disparity map 520 of the second image 320, in accordance with an example embodiment. In an example embodiment, the third disparity map 500 is generated from the first disparity map 400 and the fourth disparity map 520 is generated from the second disparity map 420. It should be noted that the disparity maps 500 and 520 are shown for representation purposes only; and such representations are not provided to represent accurate disparity maps generated from the disparity maps 400 and 420, respectively, but to facilitate description of some example embodiments only. In an example embodiment, each pixel in the first image 300 that is labeled as the background label L1 in the disparity map 400 is selected and checked whether the selected pixel is labeled incorrectly as the background label L1 (for example, the pixels in the region 406 are labeled incorrectly). As described with reference to FIG. 2, a first minimum data cost and a second minimum data cost are calculated for each pixel in the first image 300 (that are labeled as the background label L1) from the first aggregated cost volume. A first ratio of the second minimum data cost and the first minimum data cost for the pixel in the first image 300 is determined. If the first ratio is greater than a threshold, the pixel is determined to be correctly labeled as the background label L1. If the first ratio is less than the threshold, then the pixel is determined to be mis-labeled as the background label L1 and the disparity label at the pixel may be updated with a disparity label corresponding to the second minimum data cost. In an example embodiment, in this manner, all pixels of the foreground that are mis-labeled (for example, wrongly labeled as L1) can be rectified and the third disparity map 500 as illustrated in FIG. 5A is generated. As depicted in FIG. 5A, the foreground object (the tree 302) now includes only the foreground labels. Similarly, the fourth disparity map 520 is generated from the second disparity map 420. In an example embodiment, each pixel in the second image 320 that is labeled as the background label L1 is selected and checked to detect mislabeling errors (for example, the pixel in the region 426) as illustrated in the second disparity map 420 of the FIG. 4B. A first minimum data cost and a second minimum data cost are calculated for each pixel in the second image 320 (that are labeled as the background label L1) from the second aggregated cost volume. A second ratio of the second minimum data cost and the first minimum data cost for the pixel in the second image 320 is determined. If the second ratio is greater than a threshold, the pixel is determined to be correctly labeled as the background label L1. If the second ratio is less than a threshold, then the pixel is determined to be mis-labeled as the background label L1 (the pixel is in the foreground and should have a foreground label) and the disparity label at the pixel can be updated with a disparity label corresponding to the second minimum data cost. By this method, all mislabeling errors can be rectified and the fourth disparity map 520 as illustrated in FIG. 5B is generated. It should also be noted that there may be occlusion pixels in the disparity maps 500 and 520, for example, a portion including occlusion pixels in the FIG. 5A is represented by an occluded portion 504, and a portion including occlusion pixels in the FIG. 5B is represented by an occluded portion 524.

Figure 6A:
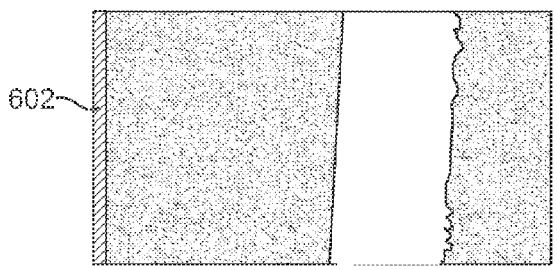
FIG. 6A illustrates an example representation of a first filtered disparity map of a first image and FIG. 6B illustrates an example representation of a second filtered disparity map of a second image, in accordance with an example embodiment.
Figure 6B:

In some scenarios, for example, as illustrated in FIG. 5A and FIG. 5B, the third disparity map 500 and the fourth disparity map 520 may include errors (for example, stray pixels in the background and holes) that can be filtered out in various example embodiments of the present technology. As illustrated in FIG. 5A, a stray pixel 502 is present in the background of the third disparity map 500. Further as illustrated in FIG. 5B, a stray pixel 522 is present in the background of the fourth disparity map 520. FIG. 6A illustrates an example representation of a first filtered disparity map 600 of the first image 300 and FIG. 6B illustrates an example representation of a second filtered disparity map 620 of the second image 320, in accordance with an example embodiment. In an example embodiment, the first filtered disparity map 600 is generated from the third disparity map 500, and the second filtered disparity map 620 is generated from the fourth disparity map 520. It should be noted that the filtered disparity maps 600 and 620 are shown for representation purposes only; and such representations are not provided to represent accurate disparity maps generated from the disparity maps 500 and 520, respectively, but to facilitate description of some example embodiments only. In another example embodiment, the first filtered disparity map 600 and the second filtered disparity map 620 may also be directly generated from the disparity maps 400 and 420, respectively.

In an example embodiment, the filtered disparity map 600 is generated by filtering the disparity labels in the third disparity map 500 based on a first confidence map. In an example embodiment, the first confidence map for disparity labels at the pixels in the first image 300 in the third disparity map 500 is determined based on the first aggregated cost volume. The first confidence map may be determined as per expression (1), described with reference to FIG. 2. The disparity labels in the third disparity map 500 are subsequently filtered based on the first confidence map to generate the first filtered disparity map 600. The first filtered disparity map 600 may be determined as per expressions (2) and (3), described with reference to FIG. 2. In another example embodiment, the first filtered disparity map 600 is generated from the first disparity map 400. A first confidence map for disparity labels at the pixels in the first image 300 in the first disparity map 400 is determined based on the first aggregated cost volume. The first confidence map may be determined as per expression (1), described with reference to FIG. 2. The disparity labels in the first disparity map 400 are subsequently filtered based on the first confidence map to generate the first filtered disparity map 600. The first filtered disparity map 600 may be determined as per expressions (2) and (3), described with reference to FIG. 2. As illustrated in FIG. 6A, the first filtered disparity map 600 is free from errors such as the stray pixels and the holes. In an example embodiment, the second filtered disparity map 620 is generated from the fourth disparity map 520. A second confidence map for disparity labels at the pixels in the second image 320 in the fourth disparity map 520 is determined based on the second aggregated cost volume. The second confidence map may be determined as per expression (1), described with reference to FIG. 2. The disparity labels in the fourth disparity map 520 are subsequently filtered based on the second confidence map to generate the second filtered disparity map 620. The second filtered disparity map 620 may be determined as per expressions (2) and (3), described with reference to FIG. 2. In another example embodiment, the second filtered disparity map 620 is generated from the second disparity map 420. A second confidence map for disparity labels at the pixels in the second image 320 in the second disparity map 420 is determined based on the second aggregated cost volume. The second confidence map may be determined as per expression (1), described with reference to FIG. 2. The disparity labels in the second disparity map 420 are subsequently filtered based on the second confidence map to generate the second filtered disparity map 620. The second filtered disparity map 620 may be determined as per expressions (2) and (3), described with reference to FIG. 2. As illustrated in FIG. 6B, the second filtered disparity map 620 is free from errors such as the stray pixels and the holes. It should also be noted that there may be occlusion pixels in the first filtered disparity map 600 and the second filtered disparity map 620, for example, a portion including occlusion pixels in the FIG. 6A is represented by an occluded portion 602, and a portion including occlusion pixels in the FIG. 6B is represented by an occluded portion 622.

Figure 7:
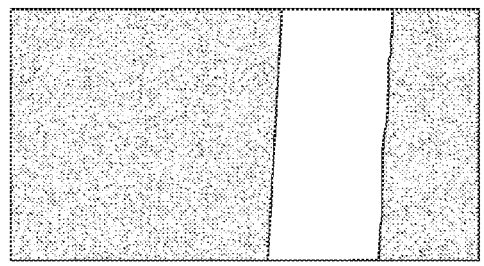
FIG. 7 illustrates an example representation of a disparity map, in accordance with an example embodiment.

FIG. 7 illustrates an example representation of a disparity map 700, in accordance with an example embodiment. It should be noted that the disparity map 700 is shown for representation purposes only; and such representation is not provided to represent accurate disparity map generated from the filtered disparity maps 600 and 620, respectively, but to facilitate description of some example embodiments only. In an example embodiment, occlusion pixels are determined by comparing the first filtered disparity map 600 and the second filtered disparity map 620, and assigning disparity labels to the occlusion pixels. The disparity map 700 is subsequently generated by combining the first filtered disparity map 600, the second filtered disparity map 620 and the assigned disparity labels to the occlusion pixels. In another example embodiment, the occlusion pixels are determined by comparing the third disparity map 500 and the fourth disparity map 520, and assigning disparity labels to the occlusion pixels. The disparity map 700 is subsequently generated by combining the third disparity map 500, the fourth disparity map 520 and the assigned disparity labels to the occlusion pixels. In yet another example embodiment, the occlusion pixels are determined by comparing the first disparity map 400 and the second disparity map 420, and assigning disparity labels to the occlusion pixels. The disparity map 700 is subsequently generated by combining the first disparity map 400, the second disparity map 420 and the assigned disparity labels to the occlusion pixels. In one example embodiment, the disparity map 700 is generated by performing at least a tree based aggregation, for example a minimum spanning tree based aggregation, of the reduced cost volume in the first image 300 and the second image 320.

Various example embodiments are capable of providing a disparity map, for example, the disparity map 700 such that disparity estimation of the foreground objects are clearly depicted in the disparity map, while suppressing the background objects by labeling the entire background with a single background label or a very limited number of background labels.

Figure 8:
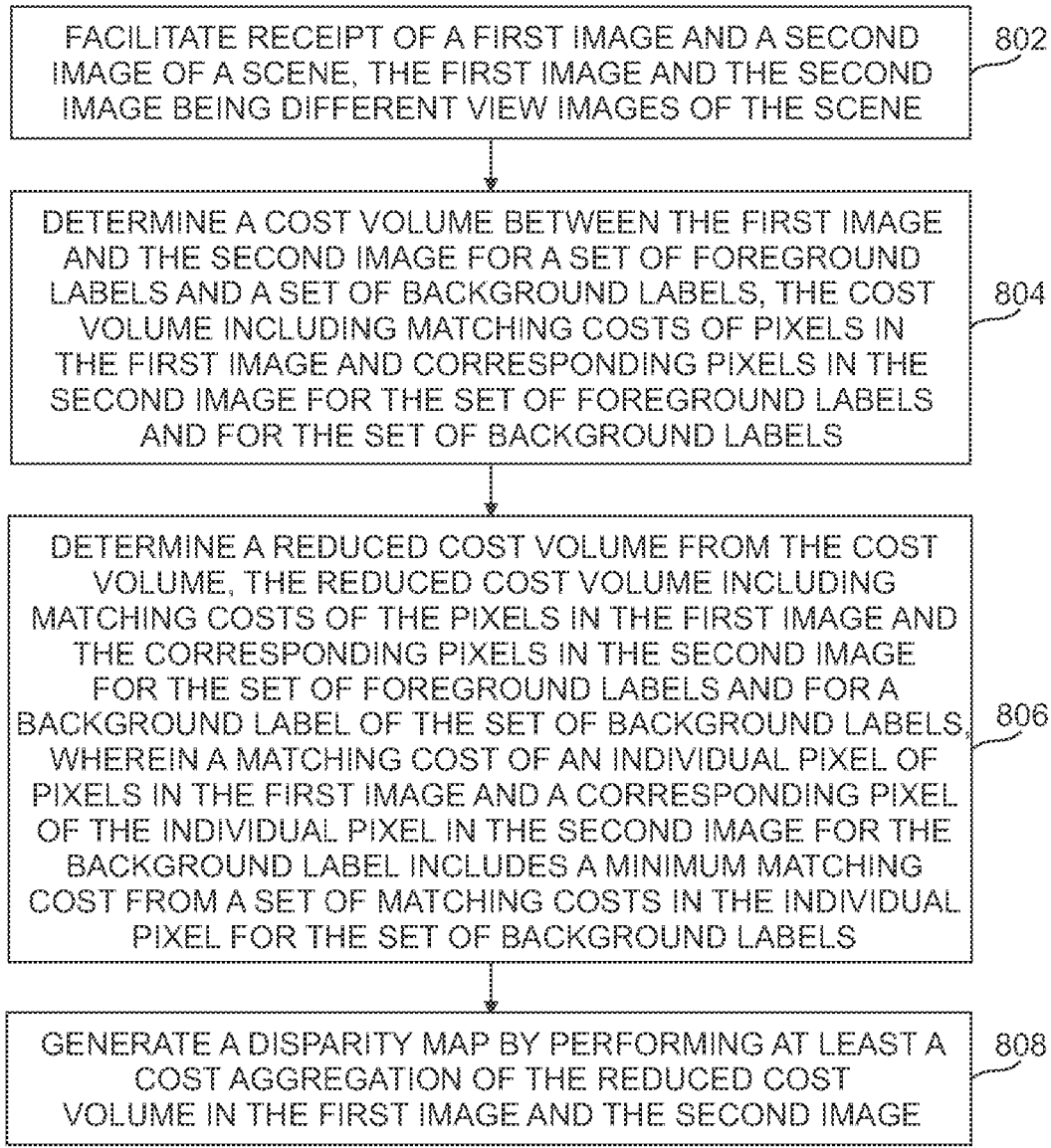
FIG. 8 is a flowchart depicting an example method for disparity estimation of foreground objects in images, in accordance with an example embodiment.

FIG. 8 is a flowchart depicting an example method 800 for disparity estimation of foreground objects in images, in accordance with an example embodiment. The method 800 is shown and explained with reference to FIG. 2. The method 800 depicted in the flowchart may be executed by, for example, the apparatus 200 of FIG. 2.

At 802, the method 800 includes facilitating receipt of a first image (I1) and a second image (I2) of a scene. In an example embodiment, the first image I1 and the second image I2 are different view images of the scene and may be captured by an image capturing device, for example the image capturing device 208. Alternatively, the first image I1 and the second image I2 may be received from external sources accessible to the apparatus 200.

At 804, the method 800 includes determining a cost volume (CV) between the first image I1 and the second image I2 for a set of foreground labels (FL) and a set of background labels (BL). In an example embodiment, the cost volume CV includes matching costs of pixels in the first image I1 and corresponding pixels in the second image I2 for the set of foreground labels FL and for the set of background labels BL. The cost volume CV can be stored in a memory, for example the memory 204. The cost volume CV is determined as described with reference to FIG. 2.

At 806, the method 800 includes determining a reduced cost volume (RCV) from the cost volume CV, where the reduced cost volume RCV includes matching costs of the pixels in the first image I1 and the corresponding pixels in the second image I2 for the set of foreground labels FL and for a background label (L1) of the set of background labels BL. In an example embodiment, a matching cost for the background label L1 of an individual pixel of pixels in the first image I1 and a corresponding pixel of the individual pixel in the second image I2 includes a minimum matching cost from a set of matching costs of the individual pixel for the set of background labels BL. The reduced cost volume RCV can be stored in a memory, for example the memory 204 or any other memory location accessible or embodied in the apparatus 200. The reduced cost volume RCV is determined as described with reference to FIG. 2.

At 808, the method 800 includes generating a disparity map (D) by performing at least a cost aggregation of the reduced cost volume RCV in the first image I1 and the second image I2. It should be noted that various kinds of cost aggregation techniques of the reduced cost volume RCV, for example, local or non-local cost aggregation may be used. For instance, cost aggregations techniques may include, but are not limited to, a tree based aggregation and an image-guided aggregation. Various example embodiments are explained by way of examples of tree based aggregation, but it should be understood that other methods of cost aggregation may also be used. Some detailed example embodiments of the disparity estimation of foreground objects are further explained with reference to FIGS. 9A-9C, 10A-10C, and 11A-11B.

Figure 9A:
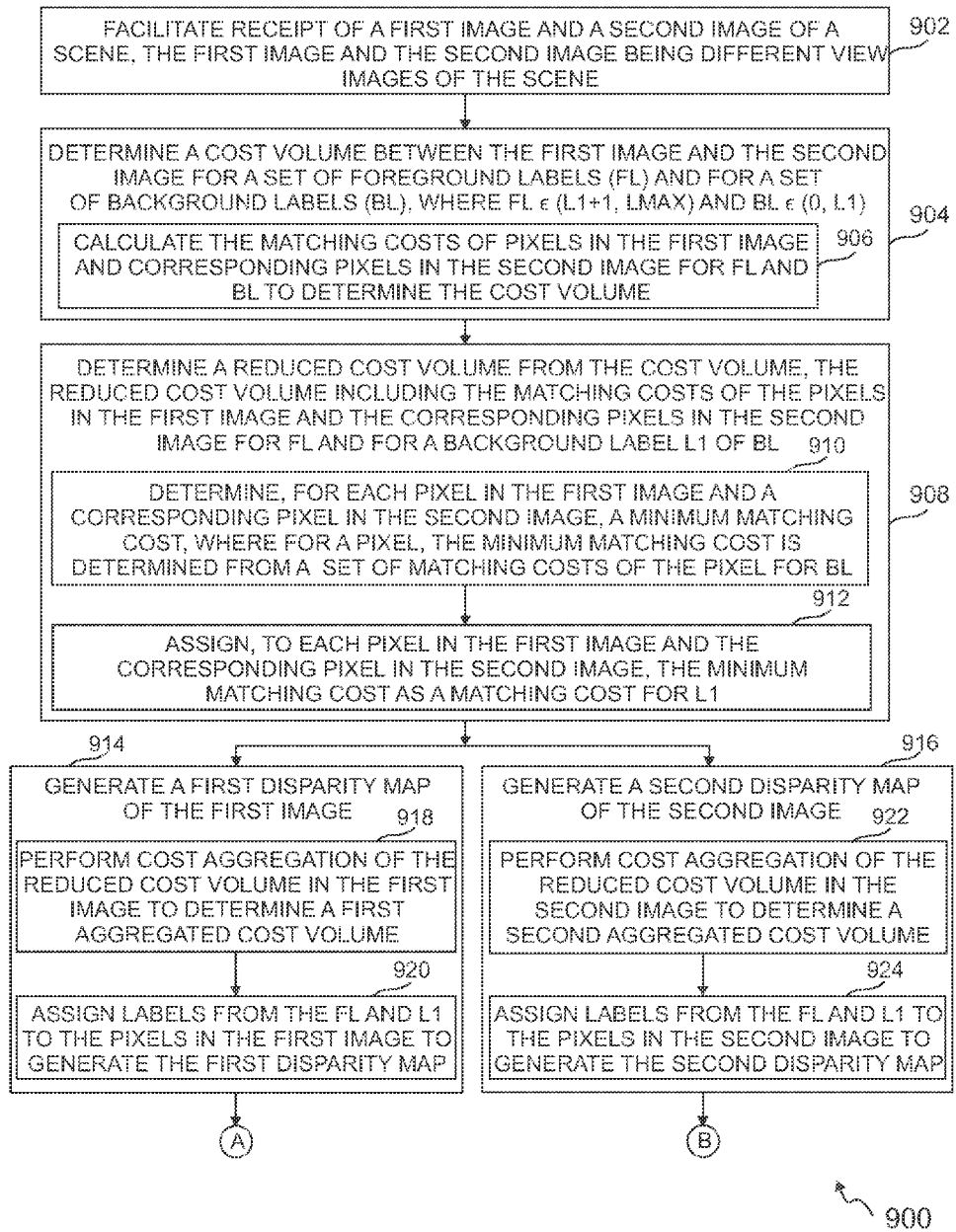
FIGS. 9A, 9B and 9C are a flowchart depicting an example method for disparity estimation of foreground objects in images, in accordance with another example embodiment.
Figure 9B:
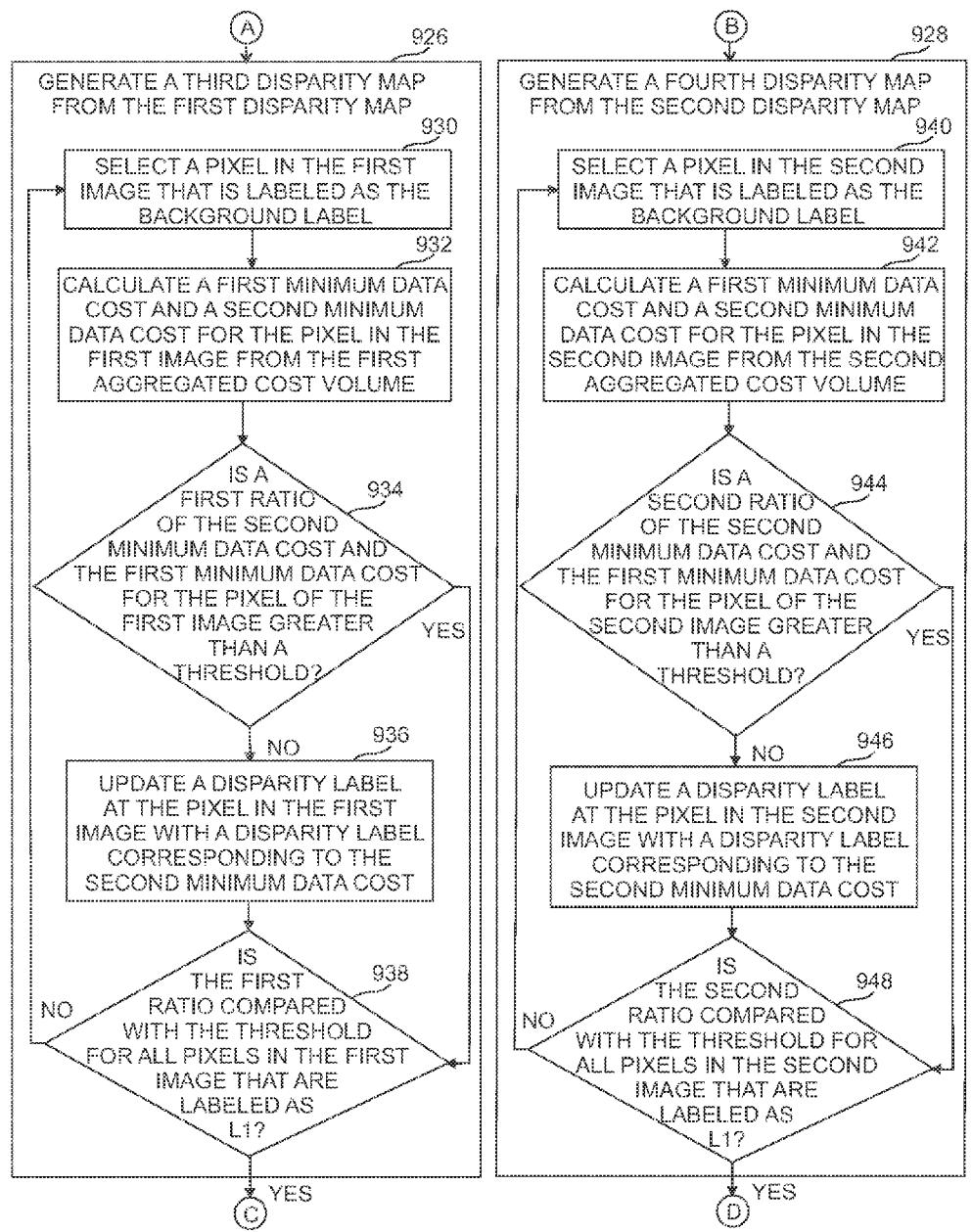
Figure 9C:
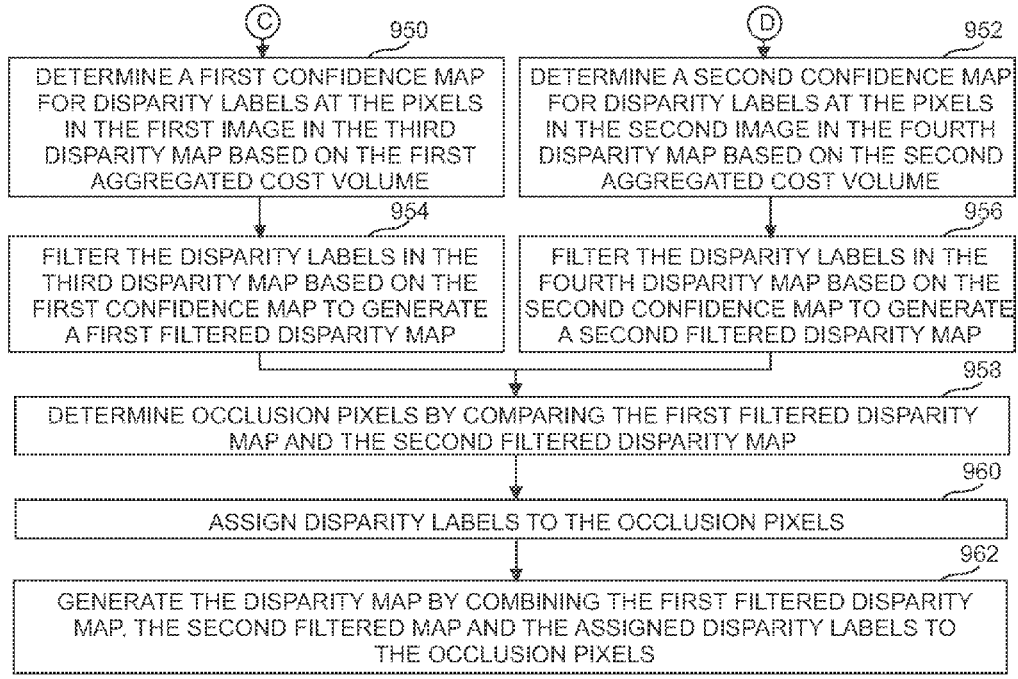

FIGS. 9A, 9B and 9C are a flowchart depicting an example method for disparity estimation of foreground objects in images, in accordance with another example embodiment. The method 900 is shown and explained with reference to FIG. 2. The method 900 depicted in the flowchart may be executed by, for example, the apparatus 200 of FIG. 2.

At 902, the method 900 includes facilitating receipt of a first image I1 and a second image I2 of a scene. In an example embodiment, the first image I1 and the second image I2 are different view images of the scene and may be captured by an image capturing device, for example the image capturing device 208. Alternatively, the first image I1 and the second image I2 may be received from external sources accessible to the apparatus 200.

At 904, the method 900 includes determining a cost volume CV between the first image I1 and the second image I2 for a set of foreground labels FL where FL ∈ (L1+1, Lmax) and for a set of background labels BL where BL ∈ (0, L1). In an example, L1 is a foreground cut-off label (for example, a boundary label) that can be provided as a user input or may be a pre-determined label. In an example embodiment, operation at the block 904 includes operation of the block 906. At 906, the method 900 includes calculating the matching costs of pixels in the first image I1 and corresponding pixels in the second image I2 for FL and for BL to determine the cost volume CV. The cost volume CV can be stored in a memory, for example the memory 204, or any memory location embodied or otherwise accessible to the apparatus 200. The cost volume CV is determined as described with reference to FIG. 2.

At 908, the method 900 includes determining a reduced cost volume RCV from the cost volume CV, where the reduced cost volume RCV includes the matching costs of the pixels in the first image I1 and the corresponding pixels in the second image I2 for FL and for a background label L1 of BL. In an example embodiment, operation at the block 908 includes operations of the block 910 and 912. At 910, the method 900 includes determining, for each pixel in the first image I1 and a corresponding pixel in the second image I2, a minimum matching cost, where for each individual pixel, the minimum matching cost is determined from a set of matching costs of the individual pixel for BL. At 912, the method 908 includes assigning, to each pixel in the first image I1 and the corresponding pixel in the second image I2, the minimum matching cost as a matching cost for L1. The reduced cost volume RCV is determined as described with reference to FIG. 2.

At 914, the method 900 includes generating a first disparity map (D1) of the first image I1, and at 916, the method 900 includes generating a second disparity map (D2) of the second image I2. The operation of the block 914 is performed by 918 and 920. At 918, the method 900 includes performing a cost aggregation of the reduced cost volume RCV in the first image I1 to determine a first aggregated cost volume (A1). At 920, the method 900 includes assigning labels from the FL and L1 to the pixels in the first image I1 to generate the first disparity map D1. In an example embodiment, the operation of the block 916 is performed by 922 and 924. At 922, the method 900 includes performing a cost aggregation of the reduced cost volume RCV in the second image I2 to determine a second aggregated cost volume (A2). At 924, the method 900 includes assigning labels from the FL and L1 to the pixels in the second image I2 to generate the second disparity map D2. The first disparity map D1 and the second disparity map D2 are determined as described with reference to FIG. 2. Some examples of the first disparity map D1 and the second disparity map D2 are described with reference to FIGS. 4A and 4B, respectively.

At 926, the method 900 includes generating a third disparity map (D3) from the first disparity map D1, and at 928, the method 900 includes generating a fourth disparity map (D4) from the second disparity map D2. In an example embodiment, the operation at the block 926 may be performed by blocks 930-938. At 930, the method 900 includes selecting a pixel in the first image I1 that is labeled as the background label L1. At 932, the method 900 includes calculating a first minimum data cost (MC1) and a second minimum data cost (MC2) for the pixel in the first image I1 from the first aggregated cost volume A1. At 934, the method 900 includes checking if a first ratio (R1) of the second minimum data cost MC2 and the first minimum data cost MC1 for the pixel in the first image I1 is greater than a threshold (T). In an example embodiment, the threshold T is an empirically fixed value. If the first ratio R1 of the second minimum data cost MC2 and the first minimum data cost MC1 for the pixel in the first image I1 is not greater than the threshold T, the method 900 goes to block 936 else operation at the block 938 is performed. At 936, the method 900 includes updating a disparity label at the pixel in the first image I1 with a disparity label corresponding to the second minimum data cost MC2. At 938, the method 900 includes checking if the first ratio R1 is compared with the threshold T for all pixels in the first image I1 that are labeled as the background label L1. If the first ratio R1 is not checked for all pixels in the first image I1 that are labeled as the background label L1, the method 900 goes to block 930 to select a next pixel in the first image I1, else 950 is performed.

In an example embodiment, the operation at the block 928 may be performed by blocks 940-948. At 940, the method 900 includes selecting a pixel in the second image I2 that is labeled as the background label L1. At 942, the method 900 includes calculating a first minimum data cost MC1 and a second minimum data cost MC2 for the pixel in the second image I2 from the second aggregated cost volume A2. At 944, the method 900 includes checking if a second ratio (R2) of the second minimum data cost MC2 and the first minimum data cost MC1 for the pixel in the second image I2 is greater than a threshold T. If the second ratio R2 of the second minimum data cost MC2 and the first minimum data cost MC1 for the pixel in the second image I2 is not greater than the threshold T, the method 900 goes to block 946 else 948 is performed. At 946, the method 900 includes updating a disparity label at the pixel in the second image I2 with a disparity label corresponding to the second minimum data cost MC2. At 948, the method 900 includes checking if the second ratio R2 is compared with the threshold T for all pixels in the second image I2 that are labeled as the background label L1. If the second ratio R2 is not checked for all pixels in the second image I2 that are labeled as the background label L1, the method 900 goes to block 940 to select a next pixel in the second image I2 else 952 is performed. The third disparity map D3 and the fourth disparity map D4 is determined as described with reference to FIG. 2. Some examples of the third disparity map D3 and the fourth disparity map D4 are described with reference to FIGS. 5A and 5B, respectively.

At 950, the method 900 includes determining a first confidence map (C1) for disparity labels at the pixels in the first image I1 in the third disparity map D3 based on the first aggregated cost volume A1. At 952, the method 900 includes determining a second confidence map (C2) for disparity labels at the pixels in the second image I2 in the fourth disparity map D4 based on the second aggregated cost volume A2. The first confidence map C1 and the second confidence map C2 is determined as described with reference to FIG. 2 and particularly with reference to expression (1).

At 954, the method 900 includes filtering the disparity labels in the third disparity map D3 based on the first confidence map C1 to generate a first filtered disparity map (F1). At 956, the method 900 includes filtering the disparity labels in the fourth disparity map D4 based on the second confidence map C2 to generate a second filtered disparity map (F2). The first filtered disparity map F1 and the second filtered disparity map F2 is determined as described with reference to FIG. 2 and expressions (2) and (3). Some examples of the first filtered disparity map F1 and the second filtered disparity map F2 are described with reference to FIGS. 6A and 6B, respectively.

At 958, the method 900 includes determining occlusion pixels by comparing the first filtered disparity map F1 and the second filtered disparity map F2. At 960, the method 900 includes assigning disparity labels to the occlusion pixels.

At 962, the method 900 includes generating the disparity map D by combining the first filtered disparity map F1, the second filtered disparity map F2 and the assigned disparity labels to the occlusion pixels. Some example embodiments of generating the disparity map D are described with reference to FIG. 2.

Figure 10A:
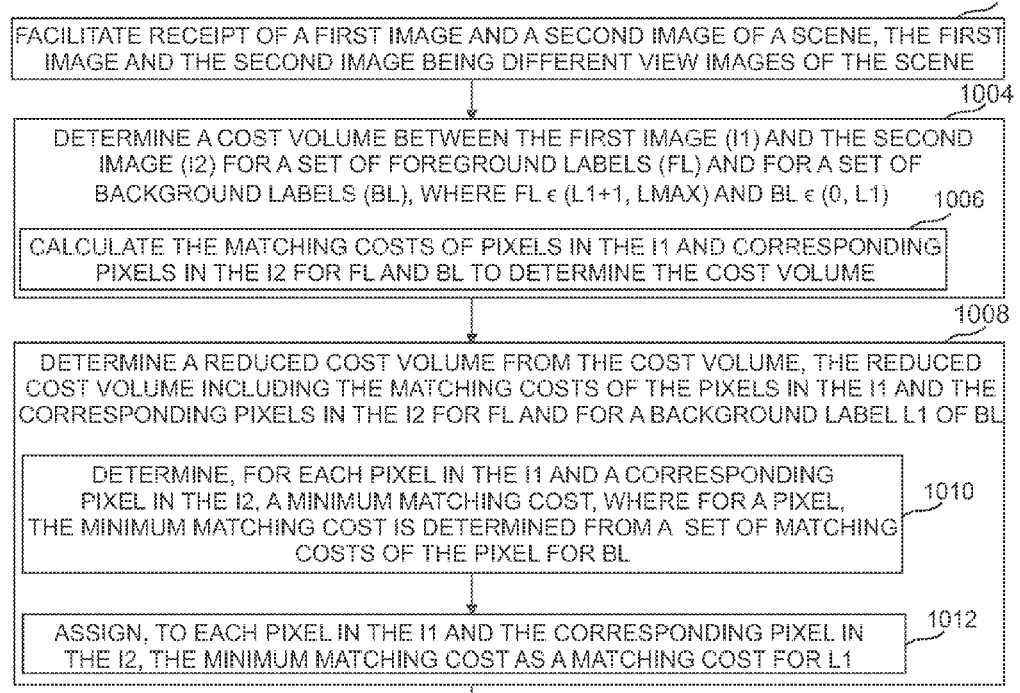
FIGS. 10A, 10B and 10C are a flowchart depicting an example method for disparity estimation of foreground objects in images, in accordance with another example embodiment.
Figure 10B:
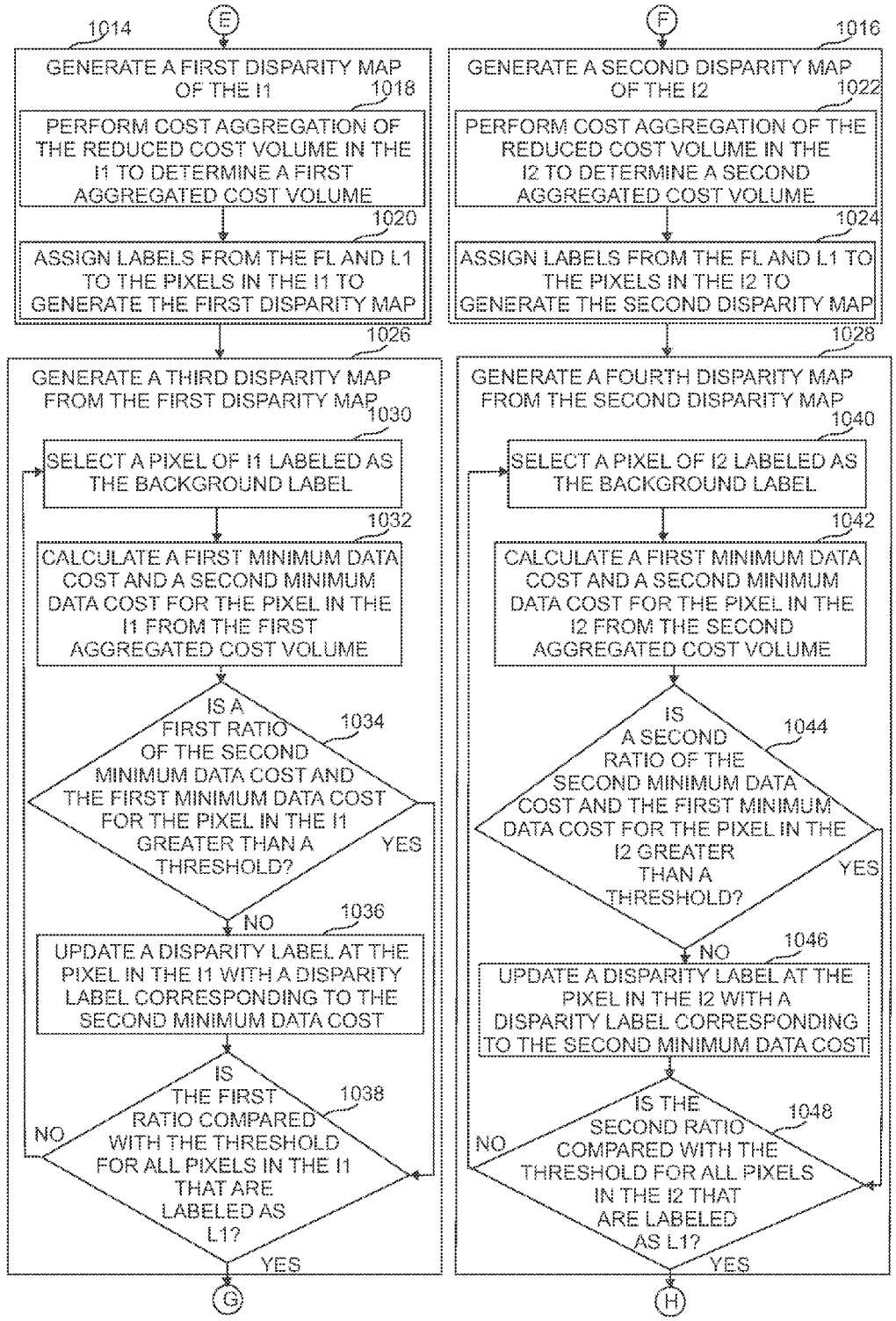
Figure 10C:
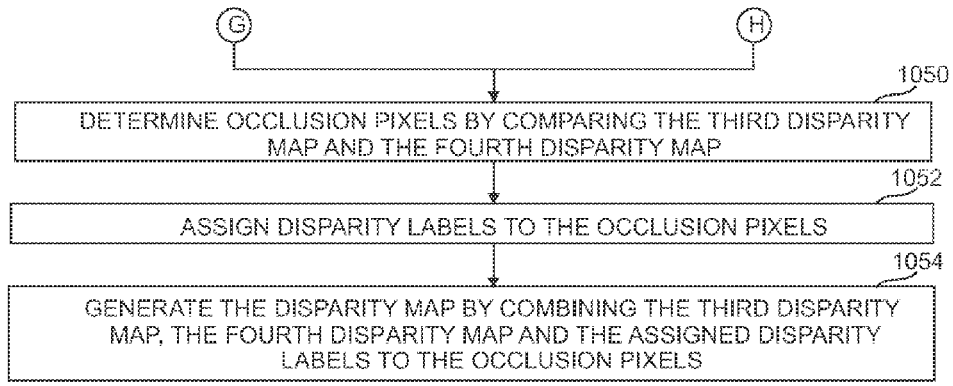

FIGS. 10A, 10B and 10C are a flowchart depicting an example method for disparity estimation of foreground objects in images, in accordance with another example embodiment. The method 1000 is shown and explained with reference to FIG. 2. The method 1000 depicted in the flowchart may be executed by, for example, the apparatus 200 of FIG. 2.

At 1002, the method 1000 includes facilitating receipt of a first image I1 and a second image I2 of a scene. In an example embodiment, the first image I1 and the second image I2 are different view images of the scene and may be captured by an image capturing device, for example the image capturing device 208. Alternatively, the first image I1 and the second image I2 may be received from external sources accessible to the apparatus 200.

At 1004, the method 1000 includes determining a cost volume CV between the first image I1 and the second image I2 for a set of foreground labels FL where FL ∈ (L1+1, Lmax) and for a set of background labels BL where BL ∈ (0, L1). In an example, L1 is a foreground cut-off label (for example, a boundary label) that can be provided as a user input or may be a pre-determined label. In an example embodiment, operation at the block 1004 includes operation of the block 1006. At 1006, the method 1000 includes calculating the matching costs of pixels in the first image I1 and corresponding pixels in the second image I2 for FL and for BL to determine the cost volume CV. The cost volume CV can be stored in a memory, for example the memory 204, or any memory location embodied or otherwise accessible to the apparatus 200. The cost volume CV is determined as described with reference to FIG. 2.

At 1008, the method 1000 includes determining a reduced cost volume RCV from the cost volume CV, where the reduced cost volume RCV includes the matching costs of the pixels in the first image I1 and the corresponding pixels in the second image I2 for FL and for a background label L1 of BL. In an example embodiment, operation at the block 1008 includes operations of the block 1010 and 1012. At 1010, the method 1000 includes determining for each pixel in the first image I1 and corresponding pixel in the second image I2, a minimum matching cost, where for each individual pixel, the minimum matching cost is determined from a set of matching costs of the individual pixel for BL. At 1012, the method 908 includes assigning, to each pixel in the first image I1 and the corresponding pixel in the second image I2, the minimum matching cost as a matching cost for L1. The reduced cost volume RCV can be stored in a memory, for example the memory 204. The reduced cost volume RCV is determined as described with reference to FIG. 2.

At 1014, the method 1000 includes generating a first disparity map D1 of the first image I1, and at 1016, the method 1000 includes generating a second disparity map D2 of the second image I2. In an example embodiment, the operation of the block 1014 is performed by 1018 and 1020. At 1018, the method 1000 includes performing a cost aggregation of the reduced cost volume RCV in the first image I1 to determine a first aggregated cost volume A1. At 1020, the method 1000 includes assigning labels from the FL and L1 to the pixels in the first image I1 to generate the first disparity map D1. In an example embodiment, the operation of the block 1016 is performed by 1022 and 1024. At 1022, the method 1000 includes performing a cost aggregation of the reduced cost volume RCV in the second image I2 to determine a second aggregated cost volume A2. At 1024, the method 1000 includes assigning labels from the FL and L1 to the pixels in the second image I2 to generate the second disparity map D2. The first disparity map D1 and the second disparity map D2 are determined as described with reference to FIG. 2. Some examples of the first disparity map D1 and the second disparity map D2 are described with reference to FIGS. 4A and 4B, respectively.

At 1026, the method 1000 includes generating a third disparity map D3 from the first disparity map D1, and at 1028, the method 1000 includes generating a fourth disparity map D4 from the second disparity map D2. In an example embodiment, the operation at the block 1026 may be performed by blocks 1030-1038. At 1030, the method 1000 includes selecting a pixel in the first image I1 that is labeled as the background label L1. At 1032, the method 1000 includes calculating a first minimum data cost MC1 and a second minimum data cost MC2 for the pixel in the first image I1 from the first aggregated cost volume A1. At 1034, the method 1000 includes checking if a first ratio R1 of the second minimum data cost MC2 and the first minimum data cost MC1 for the pixel in the first image I1 is greater than a threshold T. In an example embodiment, the threshold T is an empirically fixed value. If the first ratio R1 of the second minimum data cost MC2 and the first minimum data cost MC1 for the pixel in the first image I1 is not greater than the threshold T, the method goes to block 1036 else operation at the block 1038 is performed. At 1036, the method 1000 includes updating a disparity label at the pixel in the first image I1 with a disparity label corresponding to the second minimum data cost MC2. At 1038, the method 1000 includes checking if the first ratio R1 is compared with the threshold T for all pixels in the first image I1 that are labeled as the background label L1. If the first ratio R1 is not checked for all pixels in the first image I1 that are labeled as the background label L1, the method 1000 goes to block 1030 to select a next pixel in the first image I1, else 1050 is performed.

In an example embodiment, the operation at the block 1028 may be performed by blocks 1040-1048. At 1040, the method 1000 includes selecting a pixel in the second image I2 that is labeled as the background label L1. At 1042, the method 1000 includes calculating a first minimum data cost MC1 and a second minimum data cost MC2 for the pixel in the second image I2 from the second aggregated cost volume A2. At 1044, the method 1000 includes checking if a second ratio R2 of the second minimum data cost MC2 and the first minimum data cost MC1 for the pixel in the second image I2 is greater than a threshold T. If the second ratio R2 of the second minimum data cost MC2 and the first minimum data cost MC1 for the pixel in the second image I2 is not greater than a threshold T, the method goes to block 1046 else 1048 is performed. At 1046, the method 1000 includes updating a disparity label at the pixel in the second image I2 with a disparity label corresponding to the second minimum data cost MC2. At 1048, the method 1000 includes checking if the second ratio R2 is compared with the threshold T for all pixels in the second image I2 that are labeled as the background label L1. If the second ratio R2 is not checked for all pixels in the second image I2 that are labeled as the background label L1, the method 1000 goes to block 1040 to select a next pixel in the second image I2, else 1050 is performed. The third disparity map D3 and the fourth disparity map D4 is determined as described with reference to FIG. 2. Some examples of the third disparity map D3 and the fourth disparity map D4 are described with reference to FIGS. 5A and 5B, respectively.

At 1050, the method 1000 includes determining occlusion pixels by comparing the third disparity map D3 and the fourth disparity map D4. At 1052, the method 1000 includes assigning disparity labels to the occlusion pixels.

At 1054, the method 1000 includes generating the disparity map D by combining the third disparity map D3, the fourth disparity map D4 and the assigned disparity labels to the occlusion pixels. Some example embodiments of generating the disparity map D are described with reference to FIG. 2.

Figure 11A:
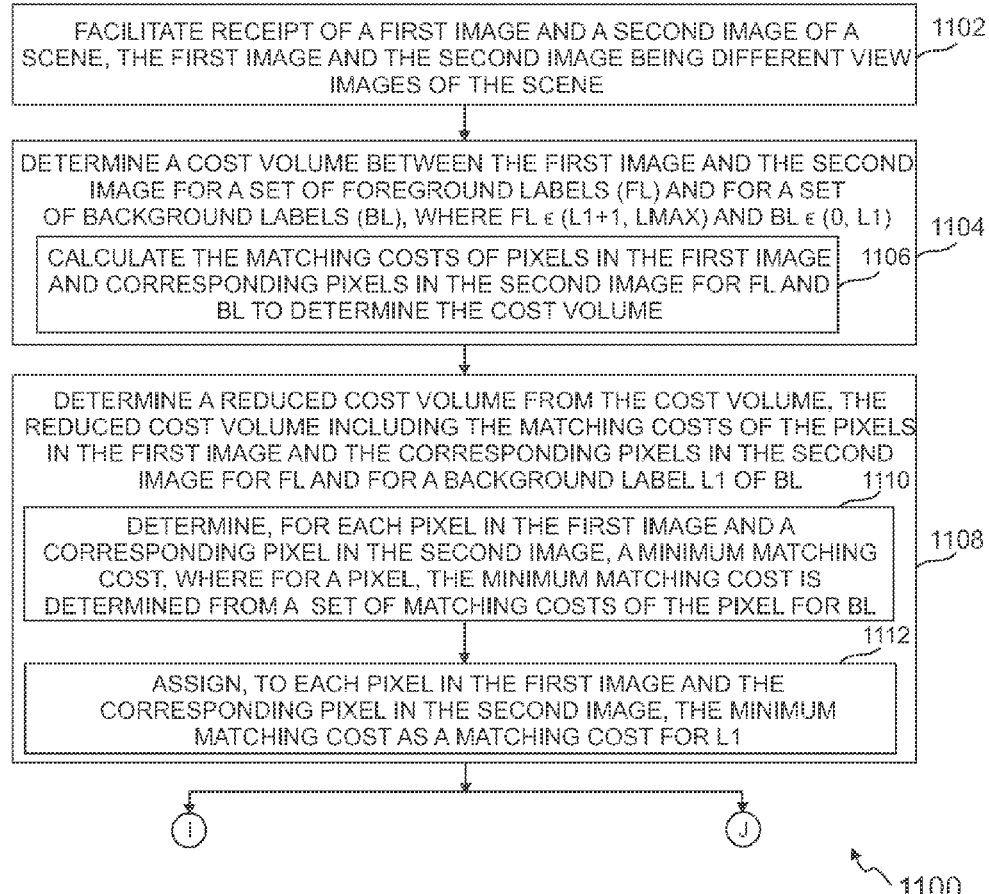
FIGS. 11A and 11B are a flowchart depicting an example method for disparity estimation of foreground objects in images, in accordance with another example embodiment.
Figure 11B:
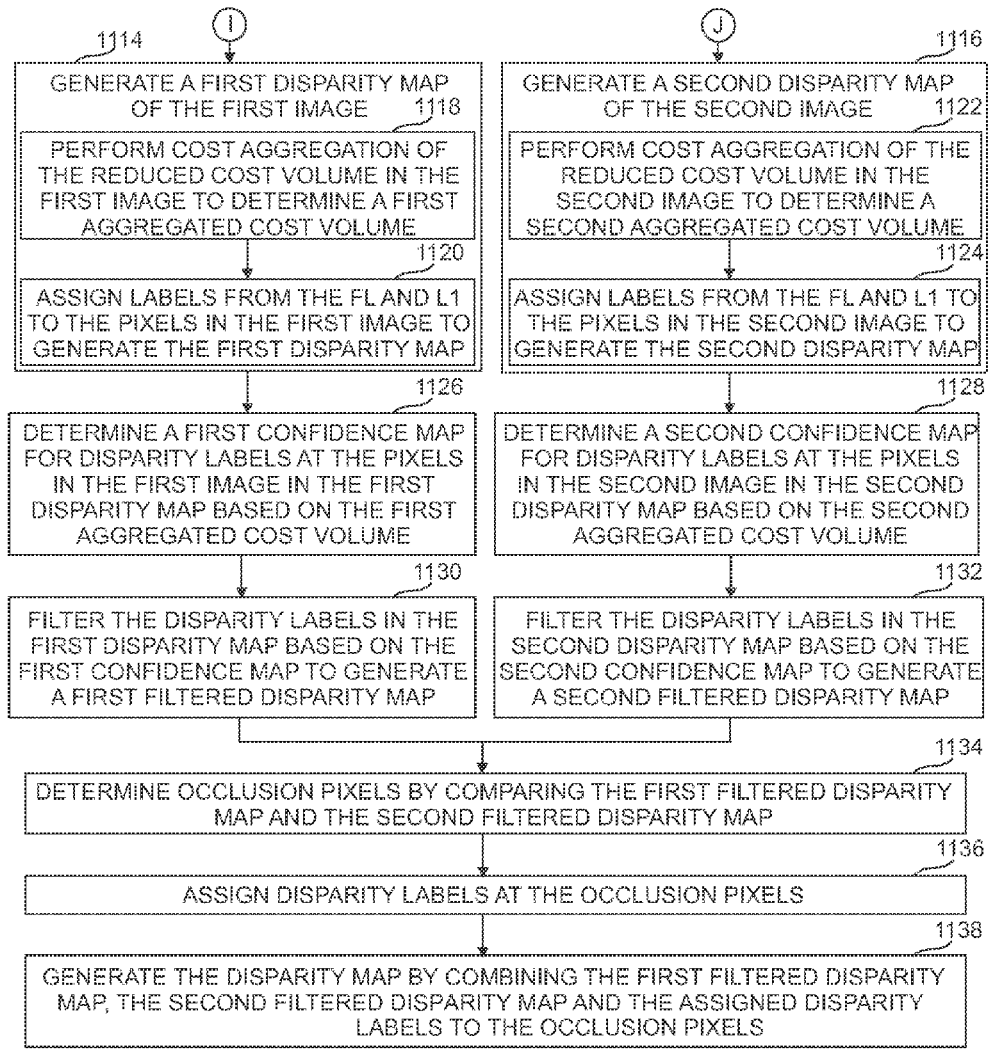

FIGS. 11A and 11B are a flowchart depicting an example method for disparity estimation of foreground objects in images, in accordance with another example embodiment. The method 1100 is shown and explained with reference to FIG. 2. The method 1100 depicted in the flowchart may be executed by, for example, the apparatus 200 of FIG. 2.

At 1102, the method 1100 includes facilitating receipt of a first image I1 and a second image I2 of a scene. In an example embodiment, the first image I1 and the second image I2 are different view images of the scene and may be captured by an image capturing device, for example the image capturing device 208. Alternatively, the first image I1 and the second image I2 may be received from external sources accessible to the apparatus 200.

At 1104, the method 1100 includes determining a cost volume CV between the first image I1 and the second image I2 for a set of foreground labels FL, where FL ∈ (L1+1, Lmax) and for a set of background labels BL, where BL ∈ (0, L1). In an example, L1 is a foreground cut-off label (for example, a boundary label) that can be provided as a user input or may be a pre-determined label. In an example embodiment, operation at the block 1104 includes operation of the block 1106. At 1106, the method 1100 includes calculating the matching costs of pixels in the first image I1 and corresponding pixels in the second image I2 for FL and for BL to determine the cost volume CV. The cost volume CV can be stored in a memory, for example the memory 204, or any memory location embodied or otherwise accessible to the apparatus 200. The cost volume CV is determined as described with reference to FIG. 2.

At 1108, the method 1100 includes determining a reduced cost volume RCV from the cost volume CV, where the reduced cost volume RCV includes the matching costs of the pixels in the first image I1 and the corresponding pixels in the second image I2 for FL and for a background label L1 of BL. In an example embodiment, operation at the block 1108 includes operations of the block 1110 and 1112. At 1110, the method 1100 includes determining, for each pixel in the first image I1 and corresponding pixel in the second image I2, a minimum matching cost, where for each individual pixel, the minimum matching cost is determined from a set of matching costs of the individual pixel for BL. At 1112, the method 1108 includes assigning, to each pixel in the first image I1 and the corresponding pixel in the second image I2, the minimum matching cost as a matching cost for L1. The reduced cost volume RCV can be stored in a memory, for example the memory 204, or any memory location embodied or otherwise accessible to the apparatus 200. The reduced cost volume RCV is determined as described with reference to FIG. 2.

At 1114, the method 1100 includes generating a first disparity map D1 of the first image I1, and at 1116, the method 1100 includes generating a second disparity map D2 of the second image I2. In an example embodiment, the operation of the block 1114 is performed by 1118 and 1120. At 1118, the method 1100 includes performing a cost aggregation of the reduced cost volume RCV in the first image I1 to determine a first aggregated cost volume A1. At 1120, the method 1100 includes assigning labels from the FL and L1 to the pixels in the first image I1 to generate the first disparity map D1. In an example embodiment, the operation of the block 1116 is performed by 1122 and 1124. At 1122, the method 1100 includes performing a cost aggregation of the reduced cost volume RCV in the second image I2 to determine a second aggregated cost volume A2. At 1124, the method 1100 includes assigning labels from the FL and L1 to the pixels in the second image I2 to generate the second disparity map D2. The first disparity map D1 and the second disparity map D2 are determined as described with reference to FIG. 2. Some examples of the first disparity map D1 and the second disparity map D2 are described with reference to FIGS. 4A and 4B, respectively.

At 1126, the method 1100 includes determining a first confidence map C1 for disparity labels at the pixels in the first image I1 in the first disparity map D1 based on the first aggregated cost volume A1. At 1128, the method 1100 includes determining a second confidence map C2 for disparity labels at the pixels in the second image I2 in the second disparity map D2 based on the second aggregated cost volume A2. The first confidence map C1 and the second confidence map C2 is determined as described with reference to FIG. 2 and particularly with reference to expression (1).

At 1130, the method 1100 includes filtering the disparity labels in the first disparity map D1 based on the first confidence map C1 to generate a first filtered disparity map F1. At 1132, the method 1100 includes filtering the disparity labels in the second disparity map D2 based on the second confidence map C2 to generate a second filtered disparity map F2. The first filtered disparity map F1 and the second filtered disparity map F2 is determined as described with reference to FIG. 2 and expressions (2) and (3). Some examples of the first filtered disparity map F1 and the second filtered disparity map F2 are described with reference to FIGS. 6A and 6B, respectively.

At 1134, the method 1100 includes determining occlusion pixels by comparing the first filtered disparity map F1 and the second filtered disparity map F2. At 1136, the method 1100 includes assigning disparity labels to the occlusion pixels.

At 1138, the method 1100 includes generating the disparity map D by combining the first filtered disparity map F1, the second filtered disparity map F2 and the assigned disparity labels to the occlusion pixels. Some example embodiments of generating the disparity map D are described with reference to FIG. 2.

It should be noted that to facilitate discussions of the flowcharts of FIGS. 8, 9A-9C, 10A-10C, and 11A-11B, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 800, 900, 1000, and 1100 are performed in an automated fashion. These operations involve substantially no interaction with the user. Other operations of the methods 800, 900, 1000, and 1100 may be performed by in a manual fashion or semi-automatic fashion. These operations involve interaction with the user via one or more user interface presentations.

The methods depicted in these flowcharts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to improve disparity estimation of foreground objects in images and suppressing background of the images. Various example embodiments provision for accurate and reliable disparity estimation of the foreground objects by considering a reduced set of labels, thereby also reducing complexity as compared to standard techniques. As the reduced set of labels result in a reduced cost volume, there are significant savings in memory that is typically used for storing the cost volume. Memory is further saved as cost aggregation is performed on the reduced set of labels. Various example embodiments provision for disparity estimation of the foreground objects by correcting errors introduced in foreground due to incorrect background labels. Further, various example embodiments removes errors in the disparity map and fills holes in the disparity map based on a confidence map and confidence filtering. Various example embodiments provision for disparity estimation of the foreground objects include performing different levels of background suppression.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
   facilitating receipt of a first image and a second image of a scene, the first image and the second image being different view images of the scene;
   determining a cost volume between the first image and the second image for a set of foreground labels and a set of background labels, the cost volume comprising matching costs of pixels in the first image and corresponding pixels in the second image for the set of foreground labels and for the set of background labels;
   determining a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and
   generating a disparity map by performing at least a cost aggregation of the reduced cost volume in the first image and the second image.

2. The method as claimed in claim 1, wherein the cost aggregation is a tree based aggregation and wherein generating the disparity map comprises:
   generating a first disparity map comprising disparity labels at pixels in the first image, wherein generating the first disparity map at least comprises:

performing the tree based aggregation of the reduced cost volume in the first image to determine a first aggregated cost volume; and assigning the disparity labels at the pixels in the first image from the set of foreground labels and the background label based on the first aggregated cost volume;

generating a second disparity map comprising disparity labels at pixels in the second image, wherein generating the second disparity map at least comprises:

performing the tree based aggregation of the reduced cost volume in the second image to determine a second aggregated cost volume; and assigning the disparity labels at the pixels in the second image from the set of foreground labels and the background label based on the second aggregated cost volume; and generating the disparity map based on the first disparity map and the second disparity map.

3. The method as claimed in claim 2, further comprising:

determining a first confidence map for the disparity labels at the pixels in the first image in the first disparity map based on the first aggregated cost volume;

determining a second confidence map for the disparity labels at the pixels in the second image in the second disparity map based on the second aggregated cost volume;

filtering the disparity labels at the pixels in the first image in the first disparity map based on the first confidence map to generate a first filtered disparity map; and filtering the disparity labels at the pixels in the second image in the second disparity map based on the second confidence map to generate a second filtered disparity map.

4. The method as claimed in claim 3, further comprising:

determining occlusion pixels by comparing the first filtered disparity map and the second filtered disparity map;

assigning disparity labels at the occlusion pixels; and combining the first filtered disparity map, the second filtered disparity map and the assigned disparity labels at the occlusion pixels to generate the disparity map.

5. The method as claimed in claim 2, wherein generating the disparity map based on the first disparity map and the second disparity map comprises:

generating a third disparity map from the first disparity map, wherein generating the third disparity map at least comprises:

determining one or more pixels in the first image that are labeled as the background label;

calculating a first minimum data cost and a second minimum data cost individually for the one or more pixels in the first image from the first aggregated cost volume;

determining first ratio of the second minimum data cost and the first minimum data cost individually for the one or more pixels in the first image;

determining, individually, whether the one or more pixels in the first image are correctly labeled as the background label based on respective first ratio; and updating, a disparity label at an individual pixel of the one or more pixels in the first image if the individual pixel is incorrectly labeled as the background label, wherein the disparity label at the individual pixel is updated with a disparity label corresponding to a respective second minimum data cost for the individual pixel;

generating a fourth disparity map from the second disparity map, wherein generating the fourth disparity map at least comprises:

determining one or more pixels in the second image that are labeled as the background label;

calculating a first minimum data cost and a second minimum data cost individually for the one or more pixels in the second image from the second aggregated cost volume;

determining second ratio of the second minimum data cost and the first minimum data cost individually for the one or more pixels in the second image;

determining, individually, whether the one or more pixels in the second image are correctly labeled as the background label based on the respective second ratio; and updating, a disparity label at an individual pixel of the one or more pixels in the second image if the individual pixel is incorrectly labeled as the background label, wherein the disparity label at the individual pixel is updated with a disparity label corresponding to a respective second minimum data cost for the individual pixel; and generating the disparity map based on the third disparity map and the fourth disparity map.

6. The method as claimed in claim 5, wherein generating the disparity map based on the third disparity map and the fourth disparity map comprises:

determining occlusion pixels by comparing the third disparity map and the fourth disparity map;

assigning disparity labels at the occlusion pixels; and combining the third disparity map, the fourth disparity map and the assigned disparity labels at the occlusion pixels to generate the disparity map.

7. The method as claimed in claim 5, wherein generating the disparity map based on the third disparity map and the fourth disparity map comprises:

determining a first confidence map for the disparity labels at the pixels in the first image in the third disparity map based on the first aggregated cost volume;

determining a second confidence map for the disparity labels at the pixels in the second image in the fourth disparity map based on the second aggregated cost volume;

filtering the disparity labels at the pixels in the first image in the third disparity map based on the first confidence map to generate a first filtered disparity map; and filtering the disparity labels at the pixels in the second image in the fourth disparity map based on the second confidence map to generate a second filtered disparity map.

8. The method as claimed in claim 3, wherein each of the first confidence map and the second confidence map comprises a plurality of confidence values for pixels in the first image and the second image, respectively, wherein a confidence value ($C_p$) for a pixel p of the pixels is determined based on an expression:

$$C_p = 1 - \frac{\sum_{d \neq d_p} e^{-\frac{(A(p,d) - A(p,d_p))^2}{\sigma^2}}}{S-1}$$

where dp is a disparity label at the pixel p of the pixels, (A(p, d)) is an aggregated data cost of the pixel p at a disparity label d, (A(p, dp)) is an aggregated data cost of the pixel p at the disparity label dp, σ is a constant scaling factor, and S is a total number of disparity labels in the set of foreground labels and the background label.

9. The method as claimed in claim 3, wherein each of the first filtered disparity map and the second filtered disparity map comprises a plurality of filtered disparity labels for pixels in the first image and the second image, respectively, wherein a filtered disparity label ($d_{pf}$) for a pixel p of the pixels is determined as per the expression:

$$d_{pf} = \frac{1}{N_p} \sum_{q \in I} e^{-\frac{D(p,q)}{\sigma}} d_q C_q$$

where dpf is a filtered disparity label, Np is a normalizing term for the pixel p, D(p, q) is a distance between the pixel p and a pixel q in the tree based aggregation, σ is the constant scaling factor, dq is a disparity label at the pixel q of the pixels, and Cq is a confidence value for the pixel q.

10. The method as claimed in claim 7, further comprising:
determining occlusion pixels by comparing the first filtered disparity map and the second filtered disparity map;
assigning disparity labels at the occlusion pixels; and
combining the first filtered disparity map, the second filtered disparity map and the assigned disparity labels at the occlusion pixels to generate the disparity map.

11. An apparatus comprising:
at least one processor; and
at least one memory comprising computer program code, the at least one memory and the computer program code configured to, with the at least one processor, cause the apparatus to at least perform:
facilitate receipt of a first image and a second image of a scene, the first image and the second image being different view images of the scene;
determine a cost volume between the first image and the second image for a set of foreground labels and a set of background labels, the cost volume comprising matching costs of pixels in the first image and corresponding pixels in the second image for the set of foreground labels and for the set of background labels;
determine a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and
generate a disparity map by performing at least a cost aggregation of the reduced cost volume in the first image and the second image.

12. The apparatus as claimed in claim 11, wherein the cost aggregation is a tree based aggregation and wherein for generating the disparity map, the apparatus is further caused, at least in part to:
generate a first disparity map comprising disparity labels at pixels in the first image, wherein to generate the first disparity map the apparatus is further configured at least to:
perform the tree based aggregation of the reduced cost volume in the first image to determine a first aggregated cost volume; and
assign the disparity labels at the pixels in the first image from the set of foreground labels and the background label based on the first aggregated cost volume;
generate a second disparity map comprising disparity labels at pixels in the second image, wherein generating the second disparity map at least comprises:
perform the tree based aggregation of the reduced cost volume in the second image to determine a second aggregated cost volume; and
assign the disparity labels at the pixels in the second image from the set of foreground labels and the background label based on the second aggregated cost volume; and
generate the disparity map based on the first disparity map and the second disparity map.

13. The apparatus as claimed in claim 12, wherein the apparatus is further caused, at least in part to:
determine a first confidence map for the disparity labels at the pixels in the first image in the first disparity map based on the first aggregated cost volume;
determine a second confidence map for the disparity labels at the pixels in the second image in the second disparity map based on the second aggregated cost volume;
filter the disparity labels at the pixels in the first image in the first disparity map based on the first confidence map to generate a first filtered disparity map; and
filter the disparity labels at the pixels in the second image in the second disparity map based on the second confidence map to generate a second filtered disparity map.

14. The apparatus as claimed in claim 13, wherein the apparatus is further caused, at least in part to:
determine occlusion pixels by comparing the first filtered disparity map and the second filtered disparity map;
assign disparity labels at the occlusion pixels; and
combine the first filtered disparity map, the second filtered disparity map and the assigned disparity labels at the occlusion pixels to generate the disparity map.

15. The apparatus as claimed in claim 12, wherein for generating the disparity map based on the first disparity map and the second disparity map, the apparatus is further caused, at least in part to:
generate a third disparity map from the first disparity map, wherein to generate the third disparity map, the apparatus is further configured at least to:
determine one or more pixels in the first image that are labeled as the background label;
calculate a first minimum data cost and a second minimum data cost individually for the one or more pixels in the first image from the first aggregated cost volume;
determine first ratio of the second minimum data cost and the first minimum data cost individually for the one or more pixels in the first image;
determine, individually, whether the one or more pixels in the first image are correctly labeled as the background label based on respective first ratio; and
update, a disparity label at an individual pixel of the one or more pixels in the first image if the individual pixel is incorrectly labeled as the background label, wherein the disparity label at the individual pixel is updated with a disparity label corresponding to a respective second minimum data cost for the individual pixel;

generate a fourth disparity map from the second disparity map, wherein to generate the fourth disparity map, the apparatus is further configured at least to:

determine one or more pixels in the second image that are labeled as the background label;

calculate a first minimum data cost and a second minimum data cost individually for the one or more pixels in the second image from the second aggregated cost volume;

determine second ratio of the second minimum data cost and the first minimum data cost individually for the one or more pixels in the second image;

determine, individually, whether the one or more pixels in the second image are correctly labeled as the background label based on the respective second ratio; and update, a disparity label at an individual pixel of the one or more pixels in the second image if the individual pixel is incorrectly labeled as the background label, wherein the disparity label at the individual pixel is updated with a disparity label corresponding to a respective second minimum data cost for the individual pixel; and generate the disparity map based on the third disparity map and the fourth disparity map.

16. The apparatus as claimed in claim 15, wherein for generating the disparity map based on the third disparity map and the fourth disparity map, the apparatus is further caused, at least in part to:

determine occlusion pixels by comparing the third disparity map and the fourth disparity map;

assign disparity labels at the occlusion pixels; and combine the third disparity map, the fourth disparity map and the assigned disparity labels at the occlusion pixels to generate the disparity map.

17. The apparatus as claimed in claim 15, wherein for generating the disparity map based on the third disparity map and the fourth disparity map, the apparatus is further caused, at least in part to:

determine a first confidence map for the disparity labels at the pixels in the first image in the third disparity map based on the first aggregated cost volume;

determine a second confidence map for the disparity labels at the pixels in the second image in the fourth disparity map based on the second aggregated cost volume;

filter the disparity labels at the pixels in the first image in the third disparity map based on the first confidence map to generate a first filtered disparity map; and filter the disparity labels at the pixels in the second image in the fourth disparity map based on the second confidence map to generate a second filtered disparity map.

18. The apparatus as claimed in claim 17, wherein the apparatus is further caused, at least in part to:

determine occlusion pixels by comparing the first filtered disparity map and the second filtered disparity map;

assign disparity labels at the occlusion pixels; and combine the first filtered disparity map, the second filtered disparity map and the assigned disparity labels at the occlusion pixels to generate the disparity map.

19. A computer program product comprising at least one non-transitory computer-readable storage medium, the non-transitory computer-readable storage medium comprising a set of instructions, which, when executed by one or more processors, cause an apparatus to at least perform:

facilitate receipt of a first image and a second image of a scene, the first image and the second image being different view images of the scene;

determine a cost volume between the first image and the second image for a set of foreground labels and a set of background labels, the cost volume comprising matching costs of pixels in the first image and corresponding pixels in the second image for the set of foreground labels and for the set of background labels;

determine a reduced cost volume from the cost volume, the reduced cost volume comprising matching costs of the pixels in the first image and the corresponding pixels in the second image for the set of foreground labels and for a background label of the set of background labels, wherein a matching cost of an individual pixel of pixels in the first image and a corresponding pixel of the individual pixel in the second image for the background label comprises a minimum matching cost from a set of matching costs of the individual pixel for the set of background labels; and generate a disparity map by performing at least a cost aggregation of the reduced cost volume in the first image and the second image.

20. The computer program product as claimed in claim 19, wherein the cost aggregation is a tree based aggregation and wherein for generating the disparity map, the apparatus is further caused, at least in part to:

generate a first disparity map comprising disparity labels at pixels in the first image, wherein generating the first disparity map at least comprises:

performing the tree based aggregation of the reduced cost volume in the first image to determine a first aggregated cost volume; and assigning the disparity labels at the pixels in the first image from the set of foreground labels and the background label based on the first aggregated cost volume;

generate a second disparity map comprising disparity labels at pixels in the second image, wherein generating the second disparity map at least comprises:

performing the tree based aggregation of the reduced cost volume in the second image to determine a second aggregated cost volume; and assigning the disparity labels at the pixels in the second image from the set of foreground labels and the background label based on the second aggregated cost volume; and generate the disparity map based on the first disparity map and the second disparity map.

21. The computer program product as claimed in claim 20, wherein the apparatus is further caused, at least in part to:

determine a first confidence map for the disparity labels at the pixels in the first image in the first disparity map based on the first aggregated cost volume;

determine a second confidence map for the disparity labels at the pixels in the second image in the second disparity map based on the second aggregated cost volume;

filter the disparity labels at the pixels in the first image in the first disparity map based on the first confidence map to generate a first filtered disparity map; and filter the disparity labels at the pixels in the second image in the second disparity map based on the second confidence map to generate a second filtered disparity map.

22. The computer program product as claimed in claim 21, wherein the apparatus is further caused, at least in part to:
determine occlusion pixels by comparing the first filtered disparity map and the second filtered disparity map;
assign disparity labels at the occlusion pixels; and
combine the first filtered disparity map, the second filtered disparity map and the assigned disparity labels at the occlusion pixels to generate the disparity map.

* * * * *